(12) United States Patent
Shin et al.

(10) Patent No.: US 11,630,639 B2
(45) Date of Patent: Apr. 18, 2023

(54) CONTROL METHOD OF ELECTRONIC DEVICE USING A PLURALITY OF SENSORS AND ELECTRONIC DEVICE THEREOF

(71) Applicant: Samsung Electronics Co., Ltd., Gyeonggi-do (KR)

(72) Inventors: Sunghee Shin, Gyeonggi-do (KR); Hyungsok Yeo, Gyeonggi-do (KR); Valeriy Prushinskiy, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/511,841

(22) Filed: Oct. 27, 2021

(65) Prior Publication Data

US 2022/0179618 A1 Jun. 9, 2022

Related U.S. Application Data

(63) Continuation of application No. PCT/KR2021/014553, filed on Oct. 19, 2021.

(30) Foreign Application Priority Data

Dec. 8, 2020 (KR) .......................... 10-2020-0170681

(51) Int. Cl.
*G06F 3/041* (2006.01)
*G06F 3/0488* (2022.01)
(Continued)

(52) U.S. Cl.
CPC .............. *G06F 3/167* (2013.01); *G06F 3/012* (2013.01); *G06F 3/013* (2013.01); *G06F 3/017* (2013.01);
(Continued)

(58) Field of Classification Search
CPC .......... G06F 3/167; G06F 3/012; G06F 3/013; G06F 3/017; G06F 3/0346; G06T 3/40;
(Continued)

(56) References Cited

U.S. PATENT DOCUMENTS 7,123,214 B2 * 10/2006 Kuroki ................ G06F 3/04815
345/158
7,557,774 B2 * 7/2009 Baudisch .............. G06F 3/1446
345/157
(Continued)

FOREIGN PATENT DOCUMENTS

CN 106547339 A 3/2017
KR 10-2011-0038568 A 4/2011
(Continued)

OTHER PUBLICATIONS

International Search Report dated Feb. 17, 2022.

*Primary Examiner* — Jordany Nunez
(74) *Attorney, Agent, or Firm* — Cha & Reiter, LLC

(57) ABSTRACT

An electronic device and method are disclosed. The electronic device may include a display, a sensor module, a processor, and a memory operatively connected to the processor. The memory stores one or more instructions that, when executed, cause the processor implements the method, including: setting an initial value by obtaining inertial information including position information, tilt information, or movement information of the electronic device, distance information between the electronic device and a user, and angle information of a face of the user, through the sensor module, determining a first virtual coordinate system mapped onto a screen of the display, based on the initial value, displaying a cursor at a position on the screen that corresponds to coordinates of one of within the first virtual coordinate system, detecting a change in the distance information, the angle information, or the inertial information (Continued)

through the sensor module after setting the initial value, and correcting a second virtual coordinate system changed from the first virtual coordinate system, based on an amount of change in the first virtual coordinate system such that the second virtual coordinate system is mapped onto the screen.

20 Claims, 20 Drawing Sheets

(51) Int. Cl.
 *G06F 3/0482* (2013.01)
 *G06F 3/16* (2006.01)
 *G06F 3/01* (2006.01)
 *G06T 3/40* (2006.01)
 *G06T 7/73* (2017.01)

(52) U.S. Cl.
 CPC .................. *G06T 3/40* (2013.01); *G06T 7/73* (2017.01); *G06T 2200/24* (2013.01); *G06T 2207/30201* (2013.01)

(58) Field of Classification Search
 CPC .................. G06T 7/73; G06T 2200/24; G06T 2207/30201; G06T 3/00
 See application file for complete search history.

(56) References Cited

U.S. PATENT DOCUMENTS

| | | | |
|---|---|---|---|
| 7,961,173 B2* | 6/2011 | Boillot | G06F 3/038 345/158 |
| 8,335,539 B1* | 12/2012 | Wu | G06F 1/1632 348/207.99 |
| 8,456,297 B2* | 6/2013 | van Os | G01C 21/367 340/425.5 |
| 8,638,296 B1* | 1/2014 | McIntosh | G06F 3/017 606/53 |
| 8,793,620 B2 | 7/2014 | Stafford | |
| 9,001,208 B2* | 4/2015 | Yasutake | H04N 21/42224 348/143 |
| 9,075,453 B2 | 7/2015 | Bhaskar et al. | |
| 9,817,475 B2* | 11/2017 | Lee | G06F 3/013 |
| 9,965,178 B2* | 5/2018 | Bang | G06F 3/0346 |
| 9,971,401 B2 | 5/2018 | Stafford | |
| 10,078,490 B2 | 9/2018 | Yi et al. | |
| 10,365,882 B2* | 7/2019 | Shin | G06F 3/16 |
| 10,567,737 B2 | 2/2020 | Lee | |
| 11,050,997 B2 | 6/2021 | Lee | |
| 11,126,260 B2* | 9/2021 | Qian | G06F 3/165 |
| 11,200,869 B1* | 12/2021 | Post | G06F 3/04815 |
| 2008/0120577 A1* | 5/2008 | Ma | G06F 3/017 715/863 |
| 2010/0058254 A1* | 3/2010 | Narita | G06F 3/0488 715/863 |
| 2012/0272179 A1 | 10/2012 | Stafford | |
| 2012/0320198 A1* | 12/2012 | Yasutake | G06F 3/005 348/143 |
| 2013/0169533 A1* | 7/2013 | Jahnke | G06F 3/017 345/158 |
| 2013/0169560 A1* | 7/2013 | Cederlund | G06F 3/013 345/173 |
| 2014/0118252 A1 | 5/2014 | Kim et al. | |
| 2014/0195918 A1* | 7/2014 | Friedlander | G06F 3/04842 715/830 |
| 2014/0208263 A1 | 7/2014 | Maklouf | |
| 2014/0333535 A1 | 11/2014 | Stafford | |
| 2014/0375541 A1 | 12/2014 | Nister et al. | |
| 2015/0067580 A1* | 3/2015 | Um | G06F 3/0481 715/781 |
| 2015/0261295 A1* | 9/2015 | Lee | G06F 3/0486 345/157 |
| 2015/0293588 A1* | 10/2015 | Strupczewski | G06F 3/012 382/117 |
| 2015/0293739 A1* | 10/2015 | Choi | G06F 3/038 345/157 |
| 2016/0026246 A1* | 1/2016 | Strupczewski | G06F 3/013 345/420 |
| 2016/0026431 A1 | 1/2016 | Yi et al. | |
| 2016/0179205 A1* | 6/2016 | Katz | G06F 3/017 345/156 |
| 2016/0306543 A1* | 10/2016 | Bang | G06F 3/0346 |
| 2017/0011557 A1* | 1/2017 | Lee | G06F 3/04842 |
| 2018/0088676 A1* | 3/2018 | Ach | G06F 3/04842 |
| 2018/0275753 A1* | 9/2018 | Publicover | G06F 3/04812 |
| 2020/0252553 A1* | 8/2020 | Luo | H04N 5/265 |

FOREIGN PATENT DOCUMENTS

| | | |
|---|---|---|
| KR | 10-2011-0076723 A | 7/2011 |
| KR | 10-2014-0052640 A | 5/2014 |
| KR | 10-2015-0137050 A | 12/2015 |
| KR | 10-2016-0024986 A | 3/2016 |
| KR | 10-2018-0001071 A | 1/2018 |
| KR | 10-2020-0132091 A | 11/2020 |

* cited by examiner

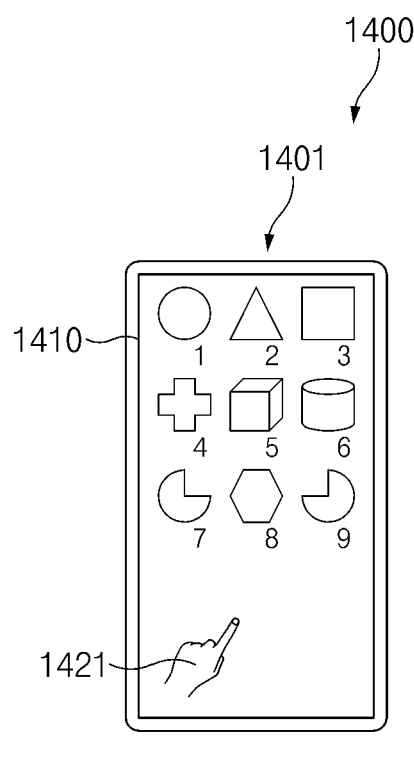
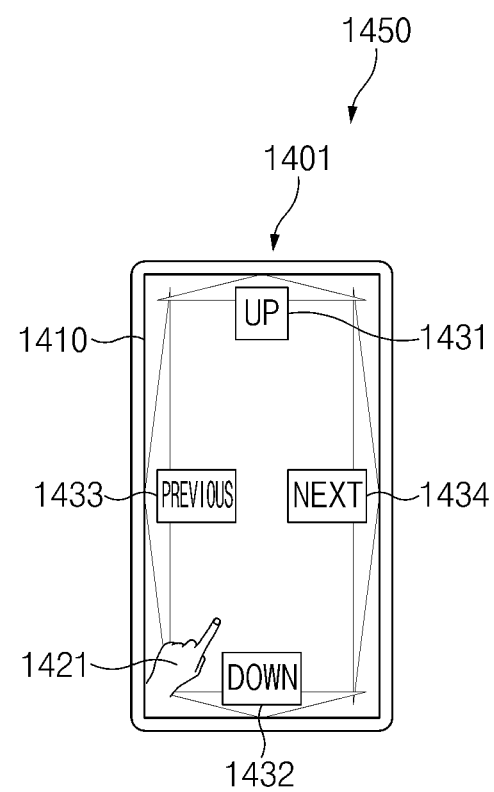
FIG.14A
FIG.14B

CONTROL METHOD OF ELECTRONIC DEVICE USING A PLURALITY OF SENSORS AND ELECTRONIC DEVICE THEREOF

CROSS-REFERENCE TO RELATED APPLICATION(S)

This application is a continuation of International Application No. PCT/KR2021/014553, filed on Oct. 19, 2021, which claims priority to Korean Patent Application No. 10-2020-0170681 filed on Dec. 8, 2020 in the Korean Intellectual Property Office, the disclosures of which are herein incorporated by reference

TECHNICAL FIELD

The disclosure relates to a control method of an electronic device using a plurality of sensors and an electronic device thereof.

BACKGROUND ART

An electronic device may support a user interface capable of receiving voice inputs as a control mechanism, using a voice signal-based artificial intelligence platform.

The electronic device may collect and determine vector information related to movement of the user's eyes and/or gaze, and may use the vector information to support interaction between the electronic device and the user.

An aspect of the disclosure is to provide a method for controlling an electronic device based on a movement or gesture of a specific part of a user's face, in conjunction with a voice signal-based artificial intelligence platform, and an electronic device thereof. This may be advantageous in a context in which both hands are not readily available for use.

Another aspect of the disclosure is to provide an electronic device and a method of adapting to a dynamic change in control context depending on positioning and alignment of the electronic device or a user (e.g., a change in the distance between the electronic device and the user, a change in the angle of the user's face, or bias of the electronic device toward one side), in which the electronic device is controlled based on movements and gestures of a portion of a user.

SUMMARY

An electronic device according to an embodiment of the disclosure may collect and determine vector information related to movement of the user's eyes and/or gaze, and may use the vector information to support interaction between the electronic device and the user.

An electronic device according to an embodiment of the disclosure includes a display, a sensor module, a processor operatively connected to the display and the sensor module, and a memory operatively connected to the processor. The memory stores one or more instructions that, when executed, cause the processor to set an initial value by obtaining inertial information including at least one of position information, tilt information, or movement information of the electronic device, distance information between the electronic device and a user, and angle information of a face of the user through the sensor module, determine a first virtual coordinate system mapped onto a screen of the display, based on the initial value, display a cursor at a position on the screen that corresponds to coordinates of one of one of the user's body parts within the first virtual coordinate system, detect a change in at least one of the distance information, the angle information, and the inertial information through the sensor module after setting the initial value, and correct a second virtual coordinate system changed from the first virtual coordinate system, based on an amount of change in the first virtual coordinate system such that the second virtual coordinate system is mapped onto the screen.

A method of an electronic device according to an embodiment of the disclosure includes setting, by at least one processor, an initial value by obtaining inertial information including at least of position information, tilt information, or movement information of the electronic device, distance information between the electronic device and a user, and angle information of a face of the user through one or more sensors, determining a first virtual coordinate system mapped onto a screen of a display, based on the initial value, displaying a cursor at a position on the screen corresponds to coordinates of one of the user's body parts within the first virtual coordinate system, after setting the initial value, detecting a change in one or more of the distance information, the angle information, or the inertial information through the one or more sensors, and correcting a second virtual coordinate system changed from the first virtual coordinate system, based on an amount of change in the first virtual coordinate system such that the second virtual coordinate system is mapped onto the screen.

According to the certain embodiments of the disclosure, the electronic device may be controlled based on a movement and/or gesture of a specific part of a user's face, in conjunction with a voice signal-based artificial intelligence platform.

According to the certain embodiments of the disclosure, the electronic device may be controlled based on a movement and/or gesture of a specific part of a user's face, which may be adaptive to a dynamic environment of the electronic device and the user.

In addition, the disclosure may provide various effects that are directly or indirectly recognized.

DESCRIPTION OF DRAWINGS

FIGS. 14A and 14B are views illustrating a control method of an electronic device according to an embodiment.

With regard to description of the drawings, identical or similar reference numerals may be used to refer to identical or similar components.

DETAILED DESCRIPTION

Figure 1:
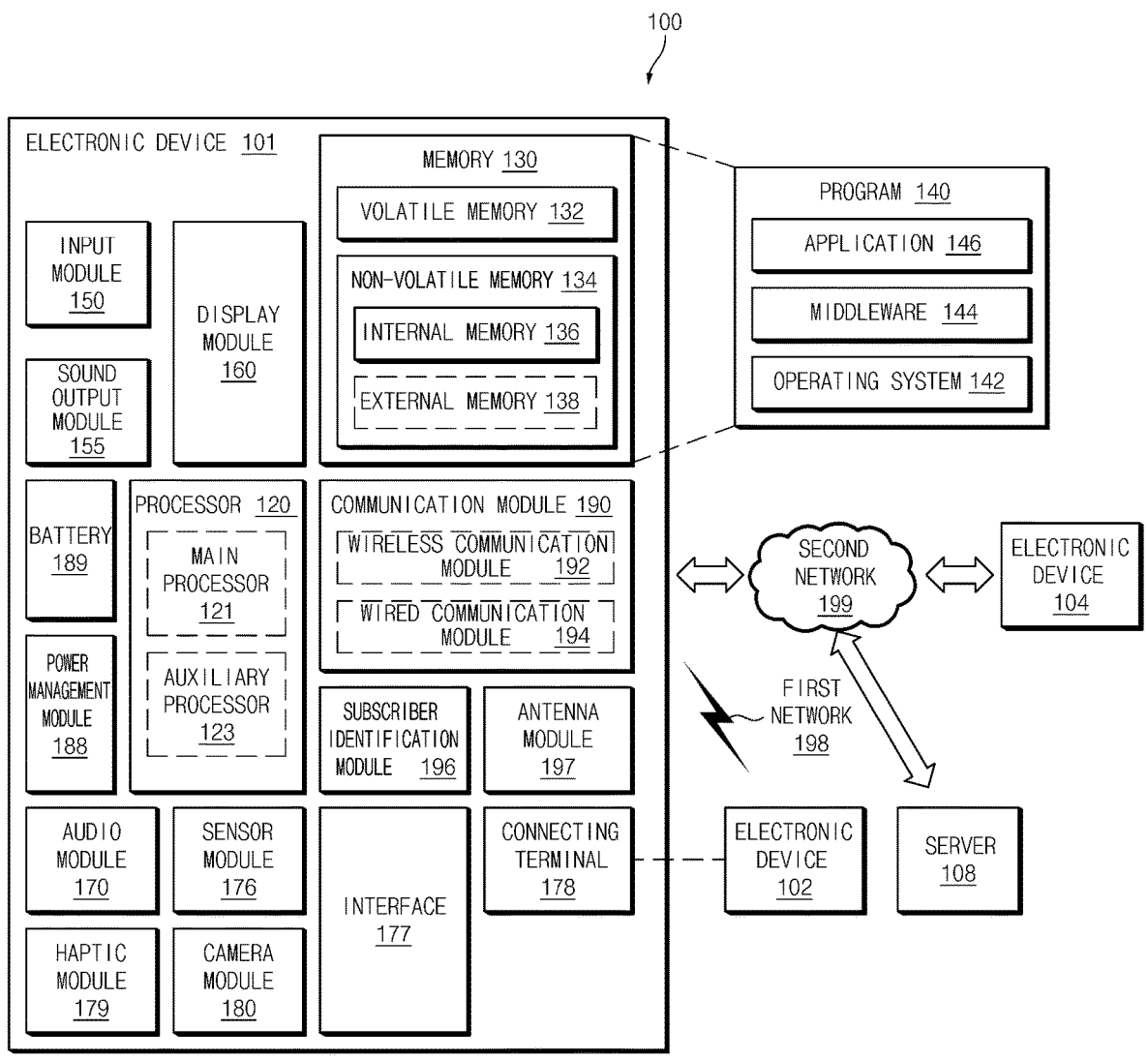
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, components and operations of an electronic device according to an embodiment will be described with reference to FIG. 2.

Figure 2:
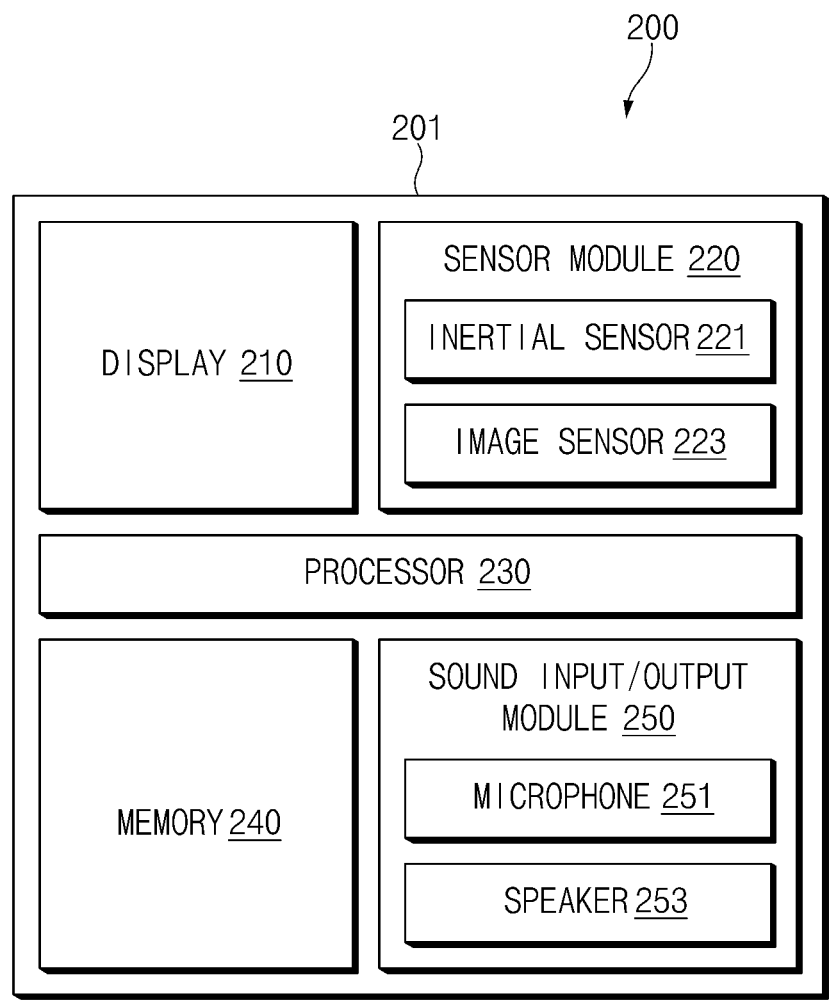
FIG. 2 is a block diagram of an electronic device according to an embodiment.

FIG. 2 is a block diagram 200 of an electronic device according to an embodiment.

Referring to FIG. 2, the electronic device 201 may include a display 210, a sensor module 220, a processor 230, memory 240, and a sound input/output module 250.

According to an embodiment, the display 210 (e.g., the display module 160 of FIG. 1) may display a user interface for performing various tasks. According to an embodiment, the display 210 may include a touch screen panel capable of sensing a user's touch input. For example, the electronic device 201 may interact with the user by receiving a touch input of the user through the display 210 and visually providing a response to the touch input through the display 210.

According to an embodiment, the sensor module 220 (e.g., the sensor module 176 of FIG. 1) may include an inertial sensor 221 and an image sensor 223. According to an embodiment, the inertial sensor 221 may sense at least one of a position, a tilt, or a movement of the electronic device 201. Hereinafter, information obtained by the inertial sensor 221 may be referred to as inertial information. That is, the inertial information may include at least one of position information, tilt information, or movement information. For example, the inertial sensor may include at least one of an acceleration sensor or a gyro sensor.

According to an embodiment, the image sensor 223 may measure the distance from the image sensor 223 to a specific object or a specific part of the user's body. The image sensor 223 may include a sensor capable of taking an RGB image and various light sources and may include, for example, a time of flight (ToF) sensor. According to an embodiment, at least one of distance information from the image sensor 223 to a specific part of the user's face or information representing the degree of bias of the user's face may be included in an image taken by the image sensor 223.

According to an embodiment, the image sensor 223 may be disposed between the display 210 and a housing surrounding the display 210 and may face the user through the display 210. Hereinafter, information representing the degree of bias of the user's face may be referred to as angle information of the user's face. For example, the angle information may mean information that represents, as an angle, the degree to which the direction of the user's face is changed with respect to the display 210 and may be determined based on a change in the area or the aspect ratio of the face.

According to an embodiment, the inertial sensor 221 or the image sensor 223 may transfer sensed data to the processor 230 in real time. According to an embodiment, the processor 230 may be operatively connected to the display 210 and the sensor module 220. According to an embodiment, the processor 230 may control the position of a cursor displayed on a screen output on the display 210, by using at least one piece of information transferred from the inertial sensor 221 or the image sensor 223.

According to an embodiment, the processor 230 may determine one virtual coordinate system among a plurality of virtual coordinate systems stored in the memory 240, based on at least one of distance information, angle information, or inertial information obtained from the sensor module 220. A virtual coordinate system may be a virtual coordinate system for displaying, as coordinates, the position of a specific part of the user's face tracked by the sensor module 220. The virtual coordinate system may be mapped onto the screen of the display 210. For example, the plurality of virtual coordinate systems stored in the memory 240 may include a virtual coordinate system having an optimum aspect ratio depending on the distance between the electronic device 201 and the user. According to an embodiment, the processor 230 may display a cursor at a position on the screen that corresponds to the coordinates of one of the user's body parts on the determined virtual coordinate system. The processor 230 may change the position of the cursor displayed on the screen, depending on a movement of one of the user's body parts.

According to an embodiment, a virtual coordinate system may be changed as at least one of distance information, angle information, or inertial information is changed, and the changed virtual coordinate system may not match the display 210. For example, as the distance between the user and the electronic device 201 is decreased or increased, the virtual coordinate system may become larger or smaller than the size by which the virtual coordinate system matches the display 210. In another example, as the angle of the user's face or the angle of the electronic device varies, the lengths of opposite horizontal sides of the virtual coordinate system or the lengths of opposite vertical sides thereof may increase or decrease at different rates. Hereinafter, an initial virtual coordinate system determined by the electronic device 201 based on an initial value of distance information, angle information, or inertial information may be referred to as a first virtual coordinate system, and a virtual coordinate system changed depending on a change in at least one of the distance information, the angle information, or the inertial information may be referred to as a second virtual coordinate system.

According to an embodiment, the processor 230 may correct the changed virtual coordinate system such that the changed virtual coordinate system matches the display 210. For example, the processor 230 may correct the changed virtual coordinate system to the previous virtual coordinate system by compensating for an amount of change in the virtual coordinate system changed depending on a movement of the electronic device 201 or the user. According to an embodiment, the previous virtual coordinate system may include a virtual coordinate system determined by the processor 230 based on an initial value of distance information, angle information, or inertial information.

According to an embodiment, the processor 230 may control the position of a cursor displayed on the display 210, by controlling the position of the cursor on a virtual coordinate system. According to an embodiment, to control the cursor using a gesture of a specific part of the user's face, the processor 230 may synchronize the cursor and the specific part of the user's face. When the cursor and the specific part of the user's face are synchronized with each other, the processor 230 may change the position of the cursor on the display as the position of the specific part of the user's face on the virtual coordinate system is changed. A method of synchronizing, by the processor 230, the cursor and the specific part of the user's face will be described below in detail with reference to FIGS. 4A and 4B. According to an embodiment, the processor 230 may move the cursor on the display 210 by moving the specific part of the user's face after the synchronization.

According to an embodiment, based on distance information, angle information, and inertial information provided from the sensor module 220 in real time, the processor 230 may correct a virtual coordinate system changed depending on a change in at least one of the distance information, the angle information, or the inertial information and may correct a change in a movement path of a cursor depending on the change in the virtual coordinate system.

According to an embodiment, the memory 240 (e.g., the memory 130 of FIG. 1) may be operatively connected to the processor 230 and may store one or more instructions performed by the processor 230. According to an embodiment, the memory 240 may store various data used by the processor 230 or the sensor module 220. The data may include, for example, software and input data or output data for a command related to the software.

According to an embodiment, the memory 240 may store various coordinate systems for correcting a mismatch between a virtual coordinate system and the display 210 that occurs depending on a change in distance information, angle information, and inertial information, and an application program or an algorithm that operates the virtual coordinate systems.

According to an embodiment, a program or algorithm that tracks a gesture of a specific part of the user's face may include various routines related to the corresponding function. For example, the various routines may include a routine for activating the inertial sensor 221 and the image sensor 223 as a function of controlling a cursor based on the gesture of the specific part of the user's face is activated, a routine for collecting an image of the user's face for extraction of feature points of the user's face using the inertial sensor 221 and the image sensor 223 activated, a routine for extracting feature points of the face from the collected image, a routine for measuring the distance between the specific part of the user's face and the image sensor 221, a routine for generating a virtual coordinate system based on the measured distance, and a routine for initializing the position of the cursor on the virtual coordinate system. Furthermore, the program or algorithm that tracks the gesture of the specific part of the user's face may include a routine for monitoring a dynamic environment between the electronic device 201 and the user in real time while the corresponding function is performed and compensating for an amount of change by comparing an initial virtual coordinate system and a changed virtual coordinate system in real time, such that the aspect ratio of the virtual coordinate system and the path of the cursor are maintained within a predetermined error range for a change in distance information, angle information, and inertial information.

According to an embodiment, the sound input/output module 250 may output various types of audio data, for example, audio data depending on playback of an audio file stored in the memory 240 and audio data received from an external device and may collect audio data. For example, the sound input/output module 250 may include, but is not limited to, a microphone 251 and a speaker 253.

According to an embodiment, as a function of tracking a gesture of a specific part of the user's face is activated, the sound input/output module 250 may output various guide sounds that support the corresponding function, such as start or end of the corresponding function. For example, when it is determined that the user's posture does not match a posture at the time of setting an initial value, the processor 230 may output, through the sound input/output module 250, a guide sound that causes the user to correct the posture in which the electronic device 201 is disposed or the user's posture to a desired posture (e.g., the posture at the time of setting the initial value).

According to an embodiment, the processor 230 may receive a voice input of the user through the sound input/output module 250. The processor 230 may analyze the voice input of the user based on an artificial intelligence platform and may perform a task requested by the user.

Although not illustrated in FIG. 2, the electronic device 201 may include communication circuitry (e.g., the communication module 190 of FIG. 1) that communicates with an external electronic device (e.g., the electronic device 104 or the server 108 of FIG. 1). The electronic device 201 may communicate with the external electronic device through a network (e.g., the second network 199 of FIG. 1). According to an embodiment, the external electronic device that communicates with the electronic device 201 may support more smoothly performing a specific function by an artificial intelligence platform on the electronic device 201. For example, the communication circuitry may transmit a voice input of the user input through the sound input/output module 250 to the external electronic device through the network and may receive a signal associated with the voice input from the external electronic device. The processor 230 may perform control to output, through at least one of the display 210 or the sound input/output module 250, the signal received from the external electronic device.

Hereinafter, an operation of setting, by an electronic device, an initial value according to an embodiment will be described with reference to FIG. 3.

Figure 3:
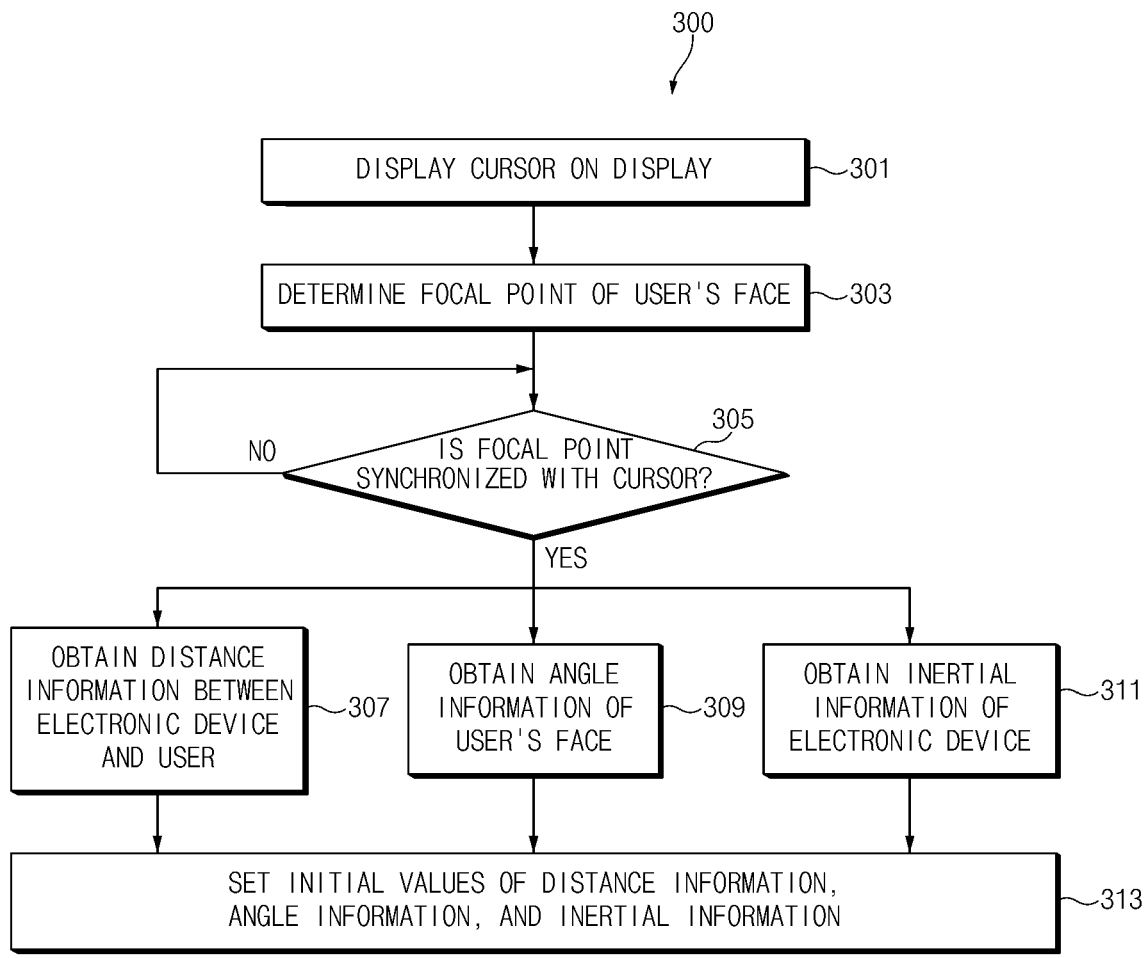
FIG. 3 is a flowchart illustrating a method of setting an initial value by an electronic device according to an embodiment.

FIG. 3 is a flowchart 300 illustrating a method of setting an initial value by an electronic device according to an embodiment. Operations of the electronic device (e.g., the electronic device 201 of FIG. 2) that will be described below may be performed by a processor (e.g., the processor 230 of FIG. 2) of the electronic device.

According to an embodiment, when receiving a user input for activating a mode for controlling a cursor based on a gesture of a specific part of a user's face, the electronic device may display, on a display (e.g., the display 210 of FIG. 2), various graphic user interfaces (GUIs) (e.g., a flickering screen or notification text) to inform of the activation of the mode, or may output a guide sound through a speaker (e.g., the speaker 253 of FIG. 2). The user input for activating the mode may include, for example, an input by a physical button or a voice command.

According to an embodiment, as the mode for controlling the cursor based on the gesture of the specific part of the user's face is activated, the electronic device may perform operation 301 to execute an initial value setting process.

In operation 301, the electronic device may display a cursor on a screen of the display. According to an embodiment, the electronic device may display the cursor at a specified position on the screen. The cursor may indicate a position where a user input generated using a specific part of the user's face is mapped onto the screen, and may include, for example, a specified image such as a pointer or a hand icon.

According to an embodiment, as the mode for controlling the cursor based on the gesture of the specific part of the user's face is activated, the electronic device may activate a plurality of sensors (e.g., the inertial sensor 221 and the image sensor 223 of FIG. 2).

In operation 303, the electronic device may determine a focal point on the user's face. According to an embodiment, the electronic device may determine a specific part of the user's face to serve as the focal point, based on an image of the user's face captured by an image sensor. According to an embodiment, the electronic device may extract at least one feature point from the image of the user's face, and may set the extracted at least one feature point as the focal point of the user's face. For example, the electronic device may determine the focal point, based on depth information of an object recognized by the image sensor and the position of the extracted feature point. For example, the focal point may include a midpoint between the centers of two pupils or an end point of a part of the user's face that is closest to the image sensor.

In operation 305, the electronic device may determine whether the focal point is synchronized with the cursor. According to an embodiment, synchronization of the focal point and the cursor may indicate a setting for controlling movement of the cursor, as displayed on the screen, according to movement of the focal point. According to an embodiment, when it is determined that the position on the screen that corresponds to the position of the focal point and the position of the cursor on the screen are adjacent to each other, the electronic device may synchronize the cursor and the focal point. For example, when it is determined that the difference between the coordinates on the screen that correspond to the position of the focal point determined based on a depth map obtained from the image sensor and the coordinates of the cursor on the screen is within a specified error range, the electronic device may provide a user interface to the user to cause the user to confirm the synchronization of the focal point and the cursor. The electronic device, when receiving an input to confirm the synchronization from the user, may complete the synchronization of the focal point and the cursor. According to an embodiment, when receiving the input to confirm the synchronization from the user, the electronic device may determine that the focal point is synchronized with the cursor, and when not receiving the input to confirm the synchronization, the electronic device may determine that the focal point is not synchronized with the cursor.

In the above-described embodiment, it has been exemplified that the electronic device performs the procedure for receiving the input to confirm the synchronization from the user. However, the disclosure is not limited thereto. When it is determined that the difference between the coordinates on the screen that correspond to the position of the focal point and the coordinates of the cursor on the screen is within the specified error range, the electronic device may immediately complete the synchronization without the confirmation procedure of the user.

According to an embodiment, when it is determined that the focal point is not synchronized with the cursor, the electronic device may provide a user interface to make a request to match the position of the focal point and the position of the cursor displayed on the display. For example, in the state in which the midpoint between the centers of the two pupils of the user is determined as the focal point, when it is determined in operation 305 that the focal point and the cursor are not synchronized with each other, the electronic device may display the text "Please, look at the cursor." on the display, or may output a voice.

According to an embodiment, the electronic device may perform operation 307, operation 309, and operation 311 when it is determined that the focal point is synchronized with the cursor.

In operation 307, the electronic device may obtain distance information between the electronic device and the user. According to an embodiment, the distance information may include a distance between the electronic device and a specific part of the user's face. For example, the electronic device may measure the distance from the image sensor to the focal point determined in operation 303, using the image sensor.

In operation 309, the electronic device may obtain angle information of the user's face. According to an embodiment, the angle information may include a direction and degree in which the user's face is biased with respect to a reference state (e.g., a dead-on facing towards the electronic device). According to an embodiment, the electronic device may determine the angle information, based on the area or the aspect ratio of the user's face recognized by the image sensor.

In operation 311, the electronic device may obtain inertial information of the electronic device. According to an embodiment, the inertial information may include information about the position, rotation, tilt, movement, or vibration of the electronic device, as detected using an inertial sensor.

According to an embodiment, the electronic device may perform operation 313 after performing operation 307, operation 309, or operation 311. In operation 313, the electronic device may set each of the obtained distance information, the obtained angle information, and the obtained inertial information as respective initial values. According to an embodiment, the electronic device may set a value corresponding to distance information obtained when the focal point is synchronized with the cursor as the initial value of the distance information. The electronic device may set a value corresponding to angle information obtained at the same time point, as the initial value of the angle information. The electronic device may set a value corresponding to inertial information obtained at the same time point, as the initial value of the inertial information.

According to an embodiment, the initial value set by the electronic device may include distance information, angle information, and inertial information in a desired arrangement state between the user and the electronic device. For example, the desired arrangement state may include a state in which the electronic device faces the user without bias of the electronic device toward one side and the user's face faces the electronic device without bias of the user's face toward one side.

According to an embodiment, after performing operation 313, the electronic device may determine an initial virtual coordinate system, based on the initial value. According to an embodiment, the electronic device may determine the initial virtual coordinate system by selecting a virtual coordinate system matching the initial value among a plurality of virtual coordinate systems stored in memory. For example, the plurality of virtual coordinate systems may include a virtual coordinate system varying depending on distance information, angle information, or inertial information.

Hereinafter, an operation of synchronizing, by an electronic device, a focal point and a cursor according to an embodiment will be described with reference to FIGS. 4A and 4B.

Figure 4A:
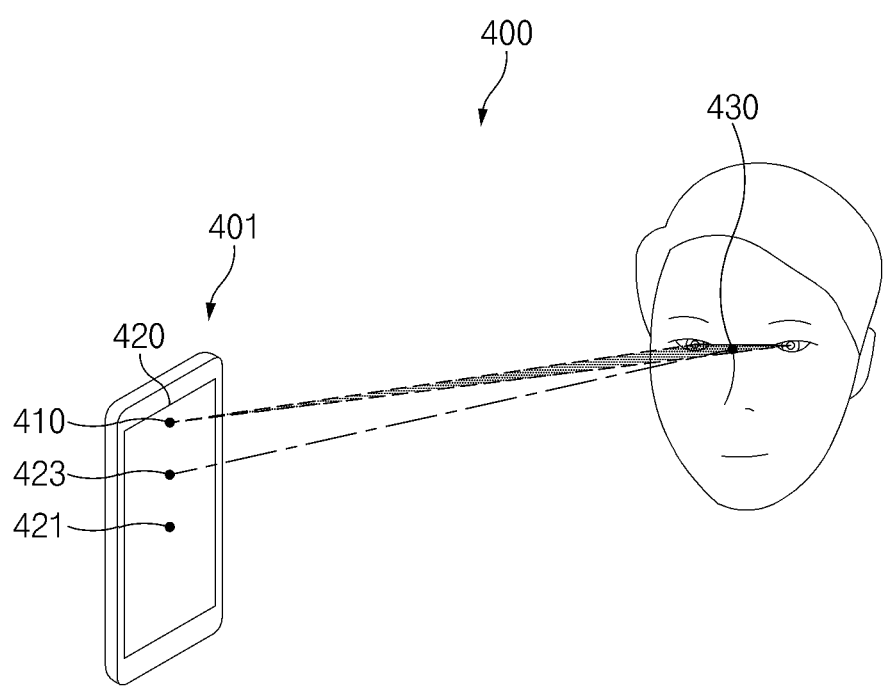
FIGS. 4A and 4B are views illustrating a method of setting an initial value by an electronic device according to an embodiment.
Figure 4B:
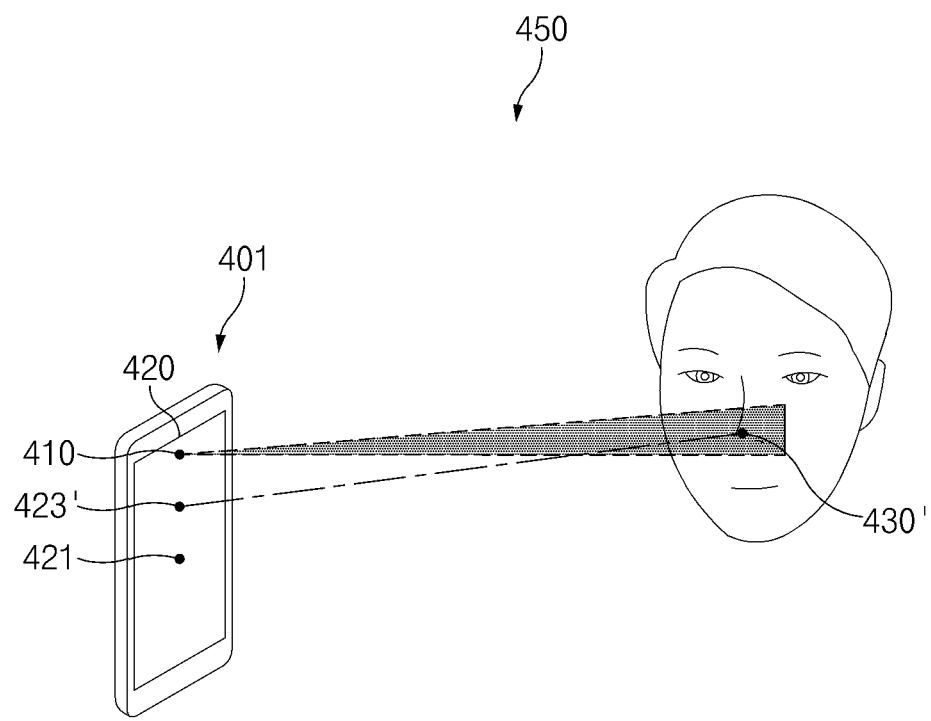

FIGS. 4A and 4B are views 400 and 450 illustrating a method of setting an initial value by an electronic device according to an embodiment. Operations to be performed by the electronic device 401 may be performed by a processor (e.g., the processor 230 of FIG. 2) of the electronic device 401.

Referring to FIG. 4, the electronic device 401 may display a cursor 421 on a display 420, when a mode for controlling a cursor based on a gesture of a specific part of a user's face is activated. For example, the cursor 421 may include a virtual object such as a pointer, an arrow, or a hand icon. The electronic device 401 may recognize the specific part of the user's face using an image sensor 410. The electronic device 401 may select a focal point to be synchronized with the cursor 421, which may be a specific part of the user's face.

Referring to FIG. 4A, the electronic device 401 may recognize the user's eyes or pupils using the image sensor 410. For example, the electronic device 401 may select a midpoint between the centers of the two pupils of the user as the focal point 430. According to an embodiment, the electronic device 401 may identify the position of the focal point 430 on a depth map obtained by the image sensor 410. The electronic device 401 may display a pointer 423 corresponding to the focal point 430 on the display 420, based on the identified position of the focal point 430.

According to an embodiment, the electronic device 401 may move the position of the pointer 423 corresponding to the focal point 430 as the user's gaze moves. For example, the electronic device 401 may provide notification (e.g., voice notification or graphic user interface (GUI) notification) to the user to move a graphic element representing an orientation of the focal point 430 onto the cursor 421. According to an embodiment, the user may move the visual representation of the focal point 430 onto the cursor 421, while recognizing that the position of the pointer 423 corresponding to the focal point 430 is changed.

According to an embodiment, when it is determined that the position of the focal point 430 identified on the depth map is within a predetermined distance from the position of the cursor 421, the electronic device 401 may synchronize the focal point 430 with the cursor 421, or may provide a user interface to the user to make a request to confirm whether to synchronize the focal point 430 with the cursor 421. For example, the electronic device 401 may synchronize the focal point 430 and the cursor 421 when receiving a response confirming synchronization from the user.

According to an embodiment, the electronic device 401 having completely synchronized the focal point 430 and the cursor 421 may control the position of the cursor 421 according to movement of the user's gaze, as detected through the focal point 430.

Referring to FIG. 4B, the electronic device 401 may recognize the user's nose as a focal point, using the image sensor 410. For example, the electronic device 401 may determine an end point of the user's nose as a focal point 430'. However, without being limited thereto, the electronic device 401 may determine, as a focal point, a point on the user's face that is determined to be closest to the electronic device 401. According to an embodiment, the electronic device 401 may identify the position of the focal point 430' on a depth map obtained by the image sensor 410. The electronic device 401 may display a pointer 423' corresponding to the focal point 430' on the display 420, based on the identified position of the focal point 430'. The above-described method may be identically applied to a method of synchronizing the focal point 430' with the cursor 421.

According to an embodiment, even in a situation in which it is impossible, or not easy, to track the user's gaze, the electronic device 401 may control the cursor using another part of the user's face, thereby providing an alternative and increasing availability of the cursor control mode.

Hereinafter, an operation of obtaining, by an electronic device, specific information based on a synchronized focal point according to an embodiment will be described with reference to FIGS. 5A to 5D.

Figure 5A:
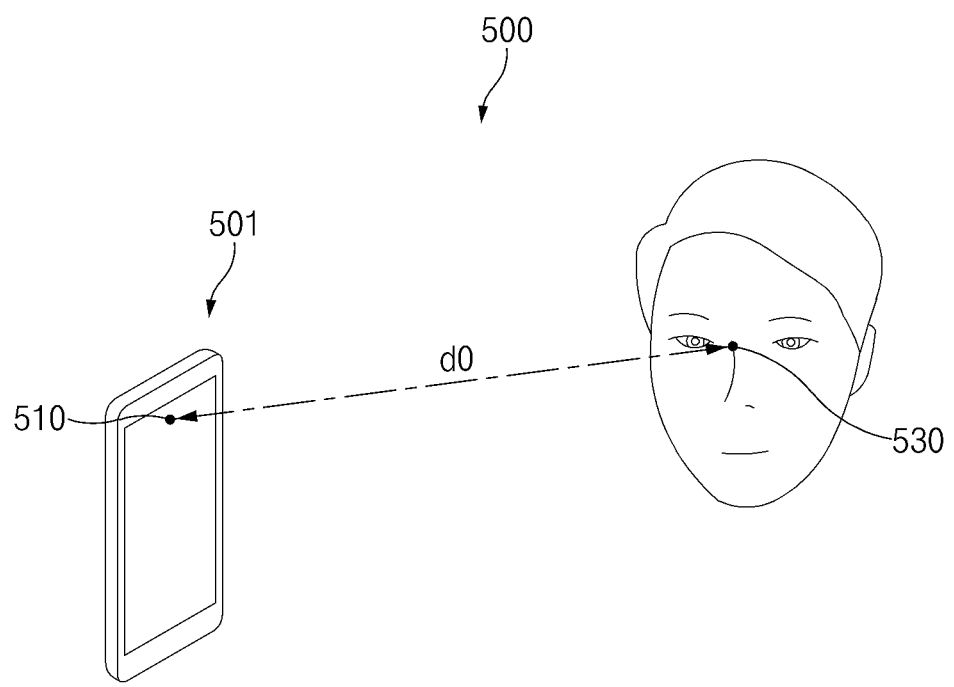
FIGS. 5A to 5D are views illustrating a method of setting an initial value by an electronic device according to an embodiment.
Figure 5B:
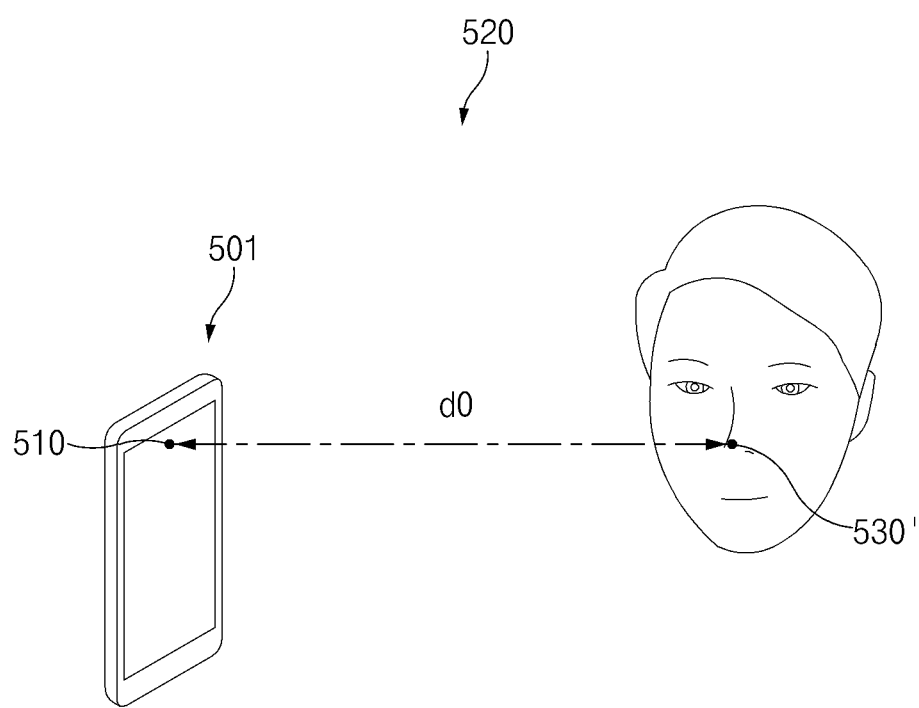

FIGS. 5A to 5B are views 500, 520, 540, and 560 illustrating a method of setting an initial value by an electronic device according to an embodiment. Operations to be performed by the electronic device 501 may be performed by a processor (e.g., the processor 230 of FIG. 2) of the electronic device 501.

According to an embodiment, the electronic device 501 may determine a focal point and may obtain distance information between the electronic device 501 and a user, based on the focal point.

According to the embodiments illustrated in FIGS. 5A and 5B, the electronic device 501 may measure the distance to the focal point using an image sensor 510. For example, the electronic device 501 may determine the distance information between the user and the electronic device 501, based on a depth map obtained by the image sensor 510.

Referring to FIG. 5A, the electronic device 501 may determine a midpoint between the centers of the user's pupils as a focal point 530 and may obtain distance information d0 from the image sensor 510 to the focal point 530. Referring to FIG. 5B, alternatively, the electronic device 501 may determine an end point of the user's nose as a focal point 530' and may obtain distance information d0 from the image sensor 510 to the focal point 530'.

Figure 5C:
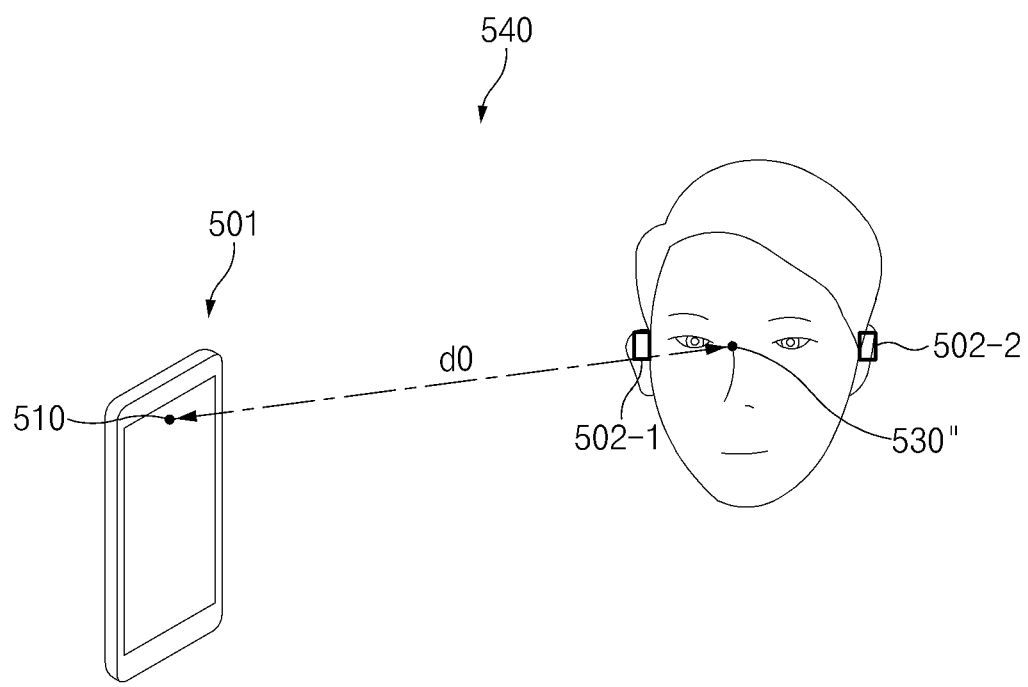
Figure 5D:
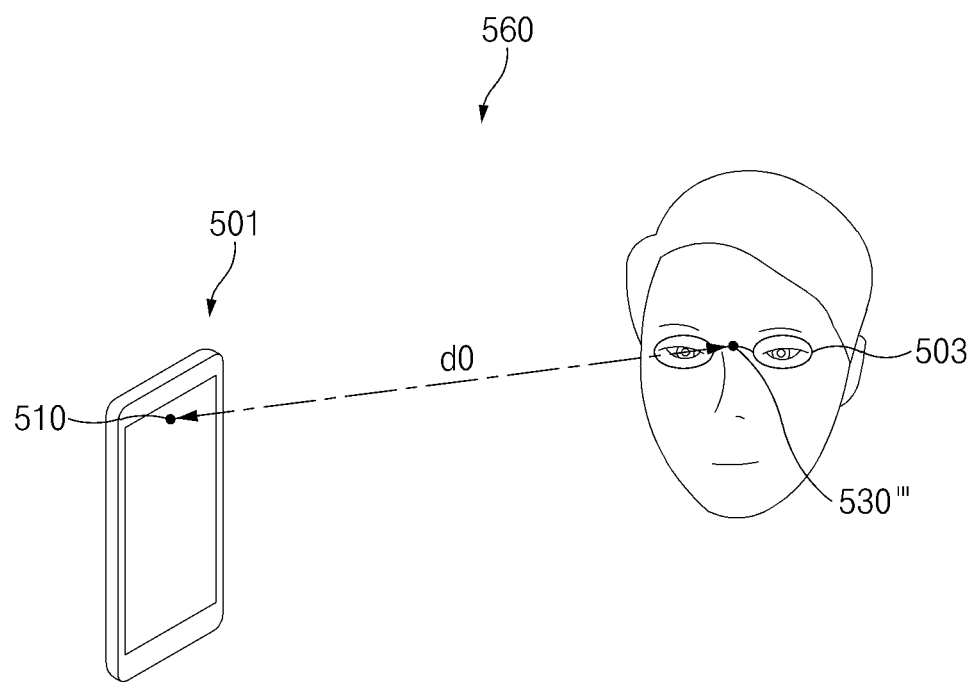

According to the embodiments illustrated in FIGS. 5C and 5D, the electronic device 501 may receive, from an external electronic device (e.g., a first external electronic device 502-1 and 502-2 or a second external electronic device 503), distance information between the user and the electronic device 501 or data and/or a signal for determining the distance information. The electronic device 501 may communicate with the first external electronic device 502-1 and 502-2 (i.e., wireless headphones) or the second external electronic device 503 (i.e., smart-glasses).

Referring to FIG. 5C, the first external electronic device 502-1 and 502-2 may be, for example, earphones. The first external electronic device 502-1 and 502-2 may be worn over (or, inserted into) the user's ears. For example, the first external electronic device 502-1 and 502-2 may include two earphones that can be worn over the left ear and the right ear of the user. For example, the electronic device 501 may communicate with the first external electronic device 502-1 and 502-2 based on a Bluetooth protocol. The electronic device 501 may identify the distance between the electronic device 501 and the first external electronic device 502-1 and 502-2, based on a Bluetooth signal received from the first external electronic device 502-1 and 502-2. For example, the electronic device 501 may determine distance information d0 between the electronic device 501 and the user with respect to a focal point 530", based on signals received from the earphone 502-1 worn over the user's right ear and the earphone 502-2 worn over the user's left ear. For example, the electronic device 501 may determine, as the focal point 530", the center between the earphone 502-1 worn over the user's right ear and the earphone 502-2 worn over the user's left ear.

Referring to FIG. 5D, the second external electronic device 503 may be smart glasses. The second external electronic device 503 may be worn (or, mounted) on the user's head such that lenses of the glasses are located over the user's eyes. According to an embodiment, the second external electronic device 503 may communicate with the electronic device 501. According to an embodiment, the second external electronic device 503 may include a camera capable of obtaining depth information. The second external electronic device 503 may identify the distance from the camera to a subject (e.g., the electronic device 501) photographed by the camera, based on the depth information. The second external electronic device 503 may transmit the depth information to the electronic device 501. The electronic device 501 may identify the distance between the electronic device 501 and the second external electronic device 503, based on the depth information received from the second external electronic device 503. For example, the electronic device 501 may determine distance information d0 between the electronic device 501 and the user with respect to a focal point 530''', based on the depth information received from the second external electronic device 503. For example, the electronic device 501 may determine the position of the camera for obtaining the depth information as the focal point 530'''.

According to certain embodiments, the second external electronic device 503 may include cameras for eye tracking that correspond to the right eye and the left eye of the user. The second external electronic device 503 may sense and track the user's pupils using at least one camera for eye tracking. For example, the second external electronic device 503 may obtain information about the gaze (or, gaze direction) of the user, based on pupil information obtained by using the at least one camera for eye tracking. The second external electronic device 503 may transmit the pupil information and/or the gaze information to the electronic device 501. For example, the electronic device 501 may identify the gaze or the gaze direction of the user, based on the pupil information and/or the gaze information received from the second external electronic device 503. In another example, the electronic device 501 may obtain angle information of the user's face, based on the pupil information and/or the gaze information received from the second external electronic device 503.

As described above with reference to FIGS. 5A to 5D, the electronic device 501 may obtain the distance information between the electronic device 501 and the user by using the various methods. According to an embodiment, the electronic device 501, when setting an initial value, may set the obtained distance information d0 as the initial value. According to an embodiment, the electronic device 501 may determine an initial virtual coordinate system, based on the initial value d0 of the distance information. According to an embodiment, the initial virtual coordinate system may include a virtual coordinate system having a plane ratio (or, an aspect ratio) specified depending on the distance information. In the embodiments illustrated in FIGS. 5A to 5D, the electronic device 501 may set the initial value of the distance information to d0 and may determine a virtual coordinate system having a plane ratio (or, an aspect ratio) corresponding to d0 as the initial virtual coordinate system.

Hereinafter, an operation of determining, by an electronic device, a two-dimensional coordinate system of an initial virtual coordinate system according to an embodiment will be described with reference to FIG. 6.

Figure 6:
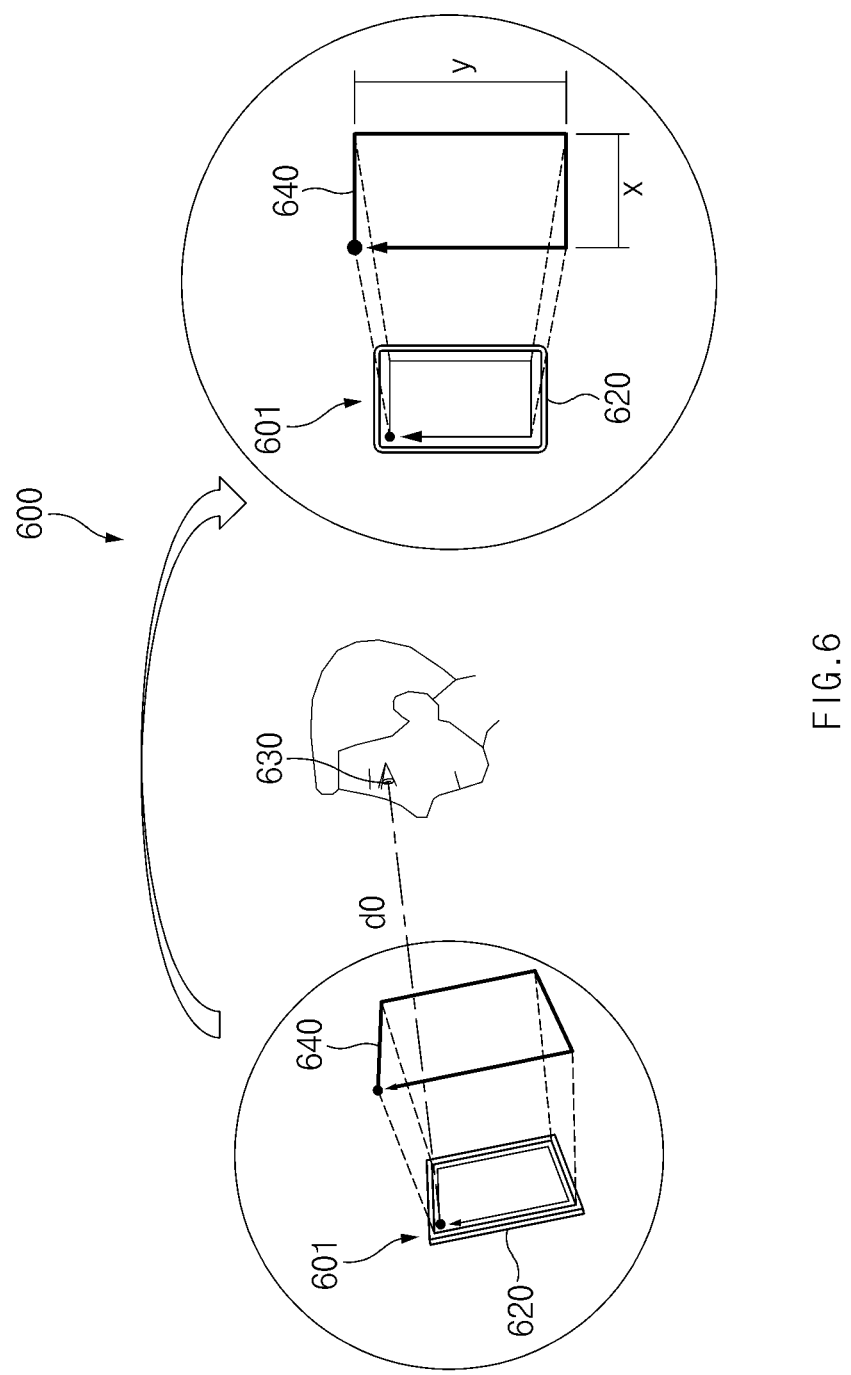
FIG. 6 is a view illustrating a method of determining an initial virtual coordinate system by an electronic device according to an embodiment.

FIG. 6 is a view 600 illustrating a method of determining an initial virtual coordinate system by an electronic device according to an embodiment. Operations to be performed by the electronic device 601 may be performed by a processor (e.g., the processor 230 of FIG. 2) of the electronic device 601.

Referring to FIG. 6, the electronic device 601, when setting an initial value, may obtain distance information between the electronic device 601 and a user with respect to a focal point 630. The electronic device 601 may set the obtained distance information d0 as an initial value of distance information. According to an embodiment, after setting the initial value of the distance information, the electronic device 601 may provide a user interface that guides movement of the focal point 630, such that the user's input through the focal point 630 traces along the periphery of a display 620. For example, the electronic device 601 may display the guidance text "Please, move the gaze along the periphery of the screen" on the display 620, or may output voice data having the same contents through a speaker.

According to an embodiment, as the user generates inputs through the focal point that trace along the periphery of the display 620 or the periphery of an output area of the display 620, the electronic device 601 may move the position of a cursor, which is displayed on the display 620 and synchronized with the focal point, along the periphery of the display 620. According to an embodiment, the electronic device 601 may obtain a movement path of the focal point and may determine a two-dimensional coordinate system 640 (e.g., (x, y)_d0), based on the movement path of the focal point. According to an embodiment, the two-dimensional coordinate system 640 of the virtual coordinate system determined depending on the distance information d0 may be set to match the display 620.

According to an embodiment, the two-dimensional coordinate system 640 may include feature information. According to an embodiment, the feature information may mean specific values capable of specifying the size and shape of the two-dimensional coordinate system 640. For example, the feature information may include the aspect ratio, the lengths of four sides, and four angles.

According to an embodiment, the electronic device 601 may monitor a change in the distance information and the feature information in real time, based on the distance information d0 determined by performing the initial value setting operation and the feature information of the two-dimensional coordinate system (e.g., (x, y)_d0). According to an embodiment, the electronic device 601 may sense a change in the distance information and the feature information using a plurality of sensors and may identify an amount of change. The electronic device 601 may correct a changed virtual coordinate system by compensating for the distance information and the feature information by the amount of change in the distance information and the feature information and may maintain feature information of the virtual coordinate system to be the same as the feature information of the initial virtual coordinate system.

Hereinafter, an operation of correcting, by an electronic device, a virtual coordinate system according to an embodiment will be described with reference to FIG. 7.

Figure 7:
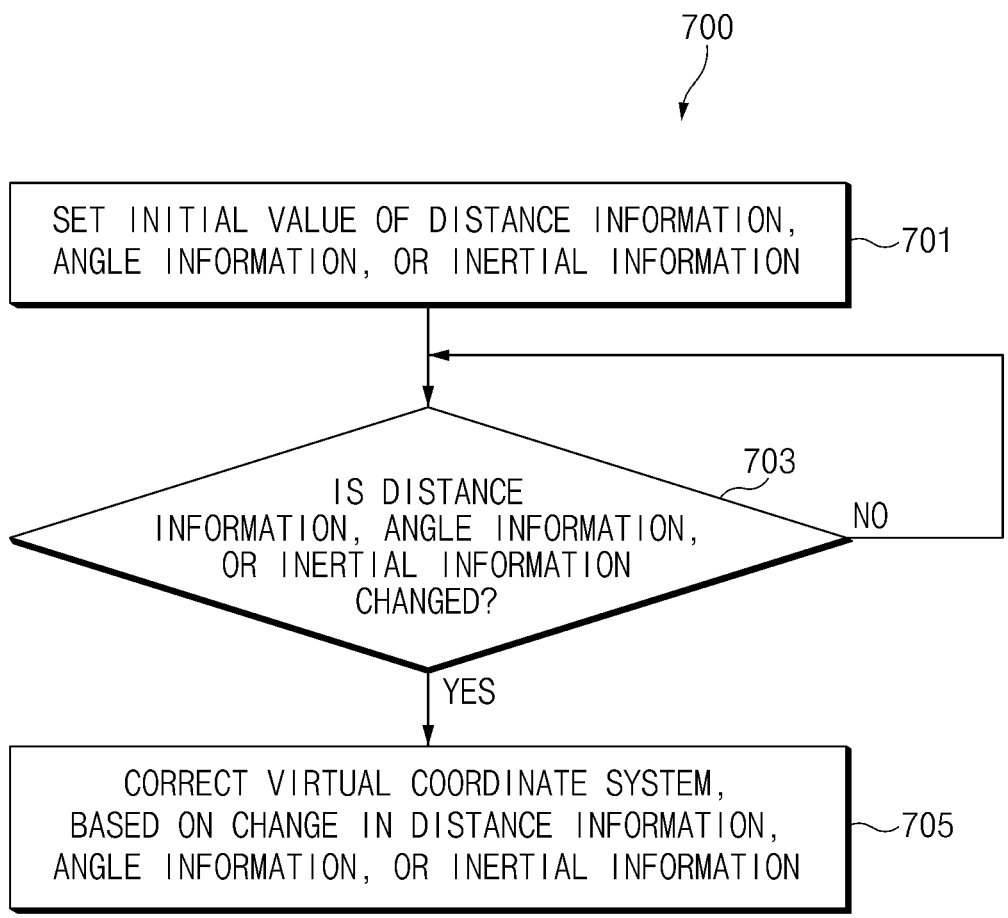
FIG. 7 is a flowchart illustrating a method of correcting a virtual coordinate system by an electronic device according to an embodiment.

FIG. 7 is a flowchart 700 illustrating a method of correcting a virtual coordinate system by an electronic device according to an embodiment. Operations to be performed by the electronic device (e.g., the electronic device 201 of FIG. 2) may be performed by a processor (e.g., the processor 230 of FIG. 2) of the electronic device.

In operation 701, the electronic device may set an initial value of distance information, angle information, or inertial information. Operation 701 may correspond to the operations depending on the initial value setting process (e.g., operation 301 to operation 311) of the electronic device illustrated in FIG. 3. Accordingly, a detailed description of operation 701 may be simplified or omitted.

According to an embodiment, the electronic device may determine an initial virtual coordinate system, based on the set initial value. The determined initial virtual coordinate system may mean a virtual coordinate system corresponding to the initial value among a plurality of virtual coordinate systems determined depending on the distance information, the angle information, or the inertial information.

In operation 703, the electronic device may determine whether the distance information, the angle information, or the inertial information has changed. According to an embodiment, the electronic device may detect whether the distance information, the angle information, or the inertial information is changed, by using an inertial sensor (e.g., the inertial sensor 221 of FIG. 2) and an image sensor (e.g., the image sensor 223 of FIG. 2). According to an embodiment, the electronic device may monitor a change in the distance information, the angle information, or the inertial information in real time.

According to an embodiment, the virtual coordinate system may be changed as the distance information, the angle information, or the inertial information is changed. For example, the size of the virtual coordinate system may be changed depending on the distance information. In another example, the aspect ratio, the horizontal length, or the vertical length of the virtual coordinate system may be changed depending on the angle information or the inertial information. According to an embodiment, the aspect ratio, the horizontal length, or the vertical length of the virtual coordinate system may be included in feature information of the two-dimensional coordinate system described above. According to an embodiment, the feature information of the two-dimensional coordinate system may be changed depending on a change in the angle information or the inertial information. An aspect in which the virtual coordinate system is changed depending on a change in the distance information, the angle information, or the inertial information will be described below in detail with reference to FIGS. 8 and 9.

According to an embodiment, when sensing that the distance information, the angle information, or the inertial information is changed, the electronic device may perform operation 705.

In operation 705, the electronic device may correct (e.g., calibrate) the virtual coordinate system, based on the change in the distance information, the angle information, or the inertial information. According to the above description, the feature information of the virtual coordinate system may be changed depending on the change in the angle information or the inertial information. According to an embodiment, the electronic device may correct the changed virtual coordinate system by compensating for the distance information and the feature information by the amount of change in the distance information and the feature information identified by using the plurality of sensors (e.g., the inertial sensor and the image sensor).

For example, the electronic device may keep a distance value constant, by subtracting an increase from the distance value when the distance value depending on the distance information increases or by adding a decrease to the distance value when the distance value decreases.

In another example, the electronic device may identify a change in the aspect ratio of the virtual coordinate system depending on bias of the electronic device or the user's face and may correct the changed virtual coordinate system such that the aspect ratio matches the aspect ratio of the initial virtual coordinate system.

In the above-described embodiment, the method of correcting, by the electronic device, the virtual coordinate system based on the change in the distance information, the angle information, or the inertial information has been described. However, the disclosure is not limited thereto. When sensing a change in the distance information, the angle information, or the inertial information, the electronic device may provide a criteria (e.g., a posture of the user or an arrangement (angle or rotation) of the electronic device) matching the initial value to the user and may cause the user to physically return to the state when the initial value is set, thereby maintaining the state in which the virtual coordinate system matches the display.

Hereinafter, a change of a virtual coordinate system depending on distance information, and a correction operation of an electronic device according to an embodiment will be described with reference to FIG. 8.

Figure 8:
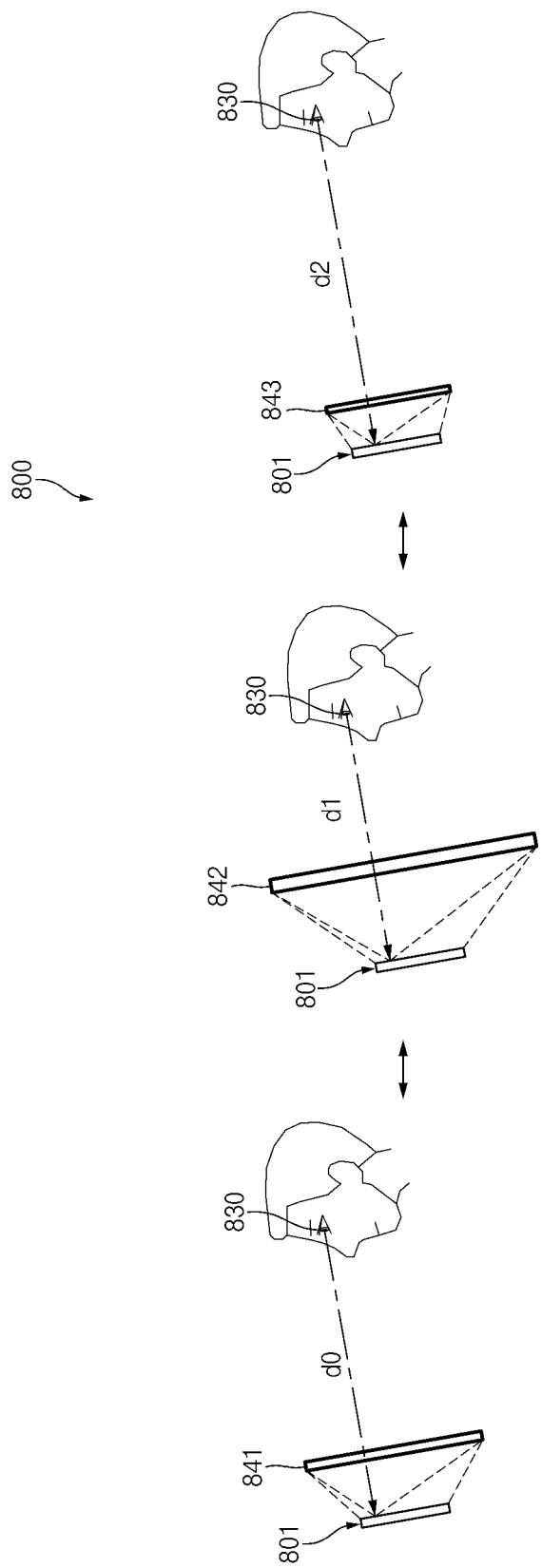
FIG. 8 is a view illustrating a change of a virtual coordinate system of an electronic device according to an embodiment.

FIG. 8 is a view 800 illustrating a change of a virtual coordinate system of an electronic device according to an embodiment. Operations to be performed by the electronic device 801 may be performed by a processor (e.g., the processor 230 of FIG. 2) of the electronic device 801.

Referring to FIG. 8, the electronic device 801 may measure the distance between the electronic device 801 and a user with respect to a focal point 830. In the embodiment illustrated in FIG. 8, it is assumed that distances d0, d1, and d2 measured by the electronic device 801 have the relation d1>d0>d2.

According to an embodiment, the electronic device 801 may determine a first virtual coordinate system 841 corresponding to d0 as an initial virtual coordinate system.

According to an embodiment, the electronic device 801 may identify that the distance between the electronic device 801 and the user has decreased from d0 to d1. According to an embodiment, as the distance between the electronic device 801 and the user is decreased, the size (i.e., the horizontal length and the vertical length) of the virtual coordinate system may be increased. For example, a second virtual coordinate system 842 that is a virtual coordinate system when the distance information is d1 may have a horizontal length and a vertical length greater than those of the first virtual coordinate system 841.

According to an embodiment, the electronic device 801 may correct the virtual coordinate system by compensating for the distance information by the amount of change in the distance information. For example, the electronic device 801 may correct the second virtual coordinate system 842 to the first virtual coordinate system 841 by increasing the distance value by d0−d1.

According to an embodiment, the electronic device 801 may also identify that the distance between the electronic device 801 and the user is increased from d0 to d2. According to an embodiment, as the distance between the electronic device 801 and the user is increased, the size (i.e., the horizontal length and the vertical length) of the virtual coordinate system may be decreased. For example, a third virtual coordinate system 843 that is a virtual coordinate system when the distance information is d2 may have a horizontal length and a vertical length smaller than those of the first virtual coordinate system 841.

According to an embodiment, the electronic device 801 may correct the virtual coordinate system by compensating for the distance information by the amount of change in the distance information. For example, the electronic device 801 may correct the third virtual coordinate system 843 to the first virtual coordinate system 841 by decreasing the distance value by d2−d0.

Hereinafter, a change of a virtual coordinate system depending on angle information or inertial information, and a correction operation of an electronic device according to an embodiment will be described with reference to FIG. 9.

Figure 9:
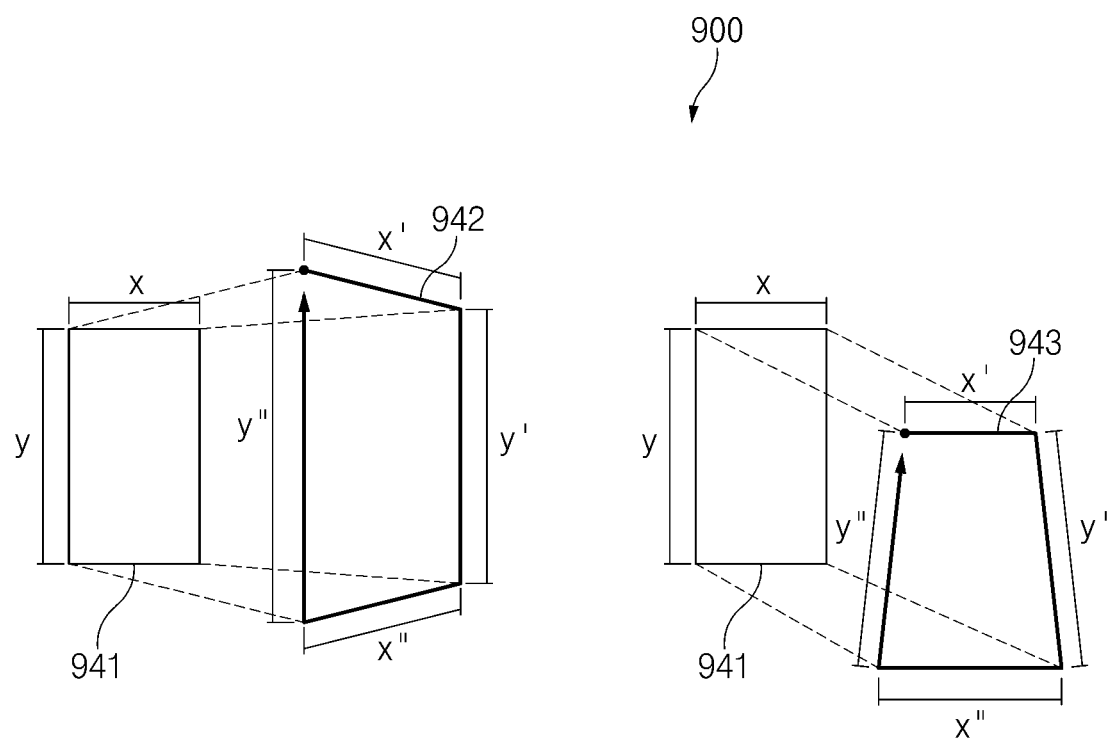
FIG. 9 is a view illustrating a change of a virtual coordinate system of an electronic device according to an embodiment.

FIG. 9 is a view 900 illustrating a change of a virtual coordinate system of an electronic device according to an embodiment. Operations to be performed by the electronic device (e.g., the electronic device 201 of FIG. 2) may be performed by a processor (e.g., the processor 230 of FIG. 2) of the electronic device.

FIG. 9 illustrates an initial virtual coordinate system (e.g., a first virtual coordinate system 941) determined by the electronic device based on an initial value and virtual coordinate systems (e.g., a second virtual coordinate system 942 or a third virtual coordinate system 943), in which aspect ratios have distorted as the electronic device or a user's face has become biased with respect to one another. The state in which the aspect ratios of the virtual coordinate systems are distorted may indicate that the aspect ratios of the virtual coordinate systems are not in agreement with the aspect ratio of the initial virtual coordinate system and may include, for example, a state in which the lengths of two horizontal sides or the lengths of two vertical sides are increased or decreased at different rates.

According to an embodiment, the electronic device may determine the first virtual coordinate system 941 as the initial virtual coordinate system, based on the initial value. For example, the lengths x of two horizontal sides of the first virtual coordinate system 941 may be equal to each other, and the lengths y of two vertical sides of the first virtual coordinate system 941 may be equal to each other.

According to an embodiment, the electronic device may detect that the aspect ratio of a virtual coordinate system is changed, based on a change in angle information or inertial information. For example, as the electronic device or the user's face is biased in the horizontal direction (e.g., leftward or rightward), the lengths of two vertical sides of a virtual coordinate system may be increased or decreased at different rates, and the lengths of two horizontal sides of the virtual coordinate system may be increased or decreased at the same rate. According to an embodiment, the lengths of two vertical sides of the second virtual coordinate system 942, which is a virtual coordinate system changed as the electronic device or the user's face is biased in the horizontal direction, may differ from each other (y'≠y"), and the lengths of two horizontal sides of the second virtual coordinate system 942 may be equal to each other (x'≠x").

According to an embodiment, the electronic device may correct a virtual coordinate system by the amount of change in horizontal length and the amount of change in vertical length. For example, the electronic device may correct the second virtual coordinate system 942 to the first virtual coordinate system 941 by compensating for the horizontal length by $\Delta x-x'$ ($=\Delta x-x''$) and compensating for the vertical length by $\Delta y-y'$ or $\Delta y-y''$ ($\neq \Delta y-y'$).

According to an embodiment, as the electronic device or the user's face becomes biased in the vertical direction (e.g., upward or downward), the lengths of two horizontal sides of a virtual coordinate system may be increased or decreased at different rates, and the lengths of two vertical sides of the virtual coordinate system may be increased or decreased at a corresponding rate. According to an embodiment, the lengths of two horizontal sides of the third virtual coordinate system 943, which is a virtual coordinate system changed as the electronic device or the user's face is biased in the vertical direction, may differ from each other (x'≠x"), and the lengths of two vertical sides of the third virtual coordinate system 943 may be equal to each other (y'≠y").

According to an embodiment, the electronic device may correct a virtual coordinate system by the amount of change in horizontal length and the amount of change in vertical length. For example, the electronic device may correct the third virtual coordinate system 943 to the first virtual coordinate system 941 by compensating for the vertical length by $\Delta y-y'$ ($=\Delta y-y''$) and compensating for the horizontal length by $\Delta x-x'$ or $\Delta x-x''$ ($\neq \Delta x-x'$).

According to the embodiments described above with reference to FIGS. 8 and 9, the electronic device may compensate for a change of a virtual coordinate system depending on a change of a dynamic environment that surrounds the electronic device and the user and may maintain feature information (e.g., the aspect ratio, the horizontal length, or the vertical length) of the virtual coordinate system determined depending on the distance between the electronic device and the user, thereby maintaining or improving the reliability of cursor control based on a gesture of a specific part of the user's face.

Hereinafter, an operation of activating, by an electronic device, a cursor mode based on a voice command according to an embodiment will be described with reference to FIG. 10. The cursor mode may include a mode for controlling a cursor based on a gesture of a specific part of a user's face according to certain embodiments of the disclosure.

Figure 10:
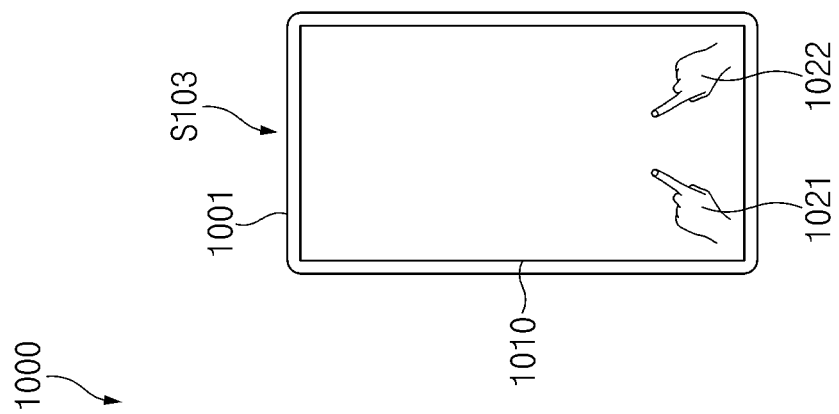
FIG. 10 is a view illustrating a control method of an electronic device according to an embodiment.
Figure 10:
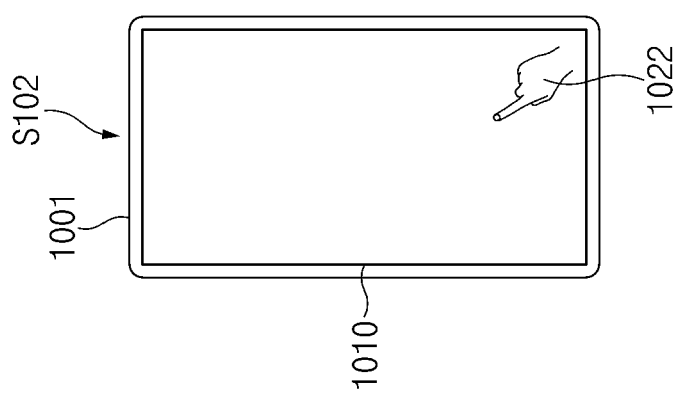
Figure 10:
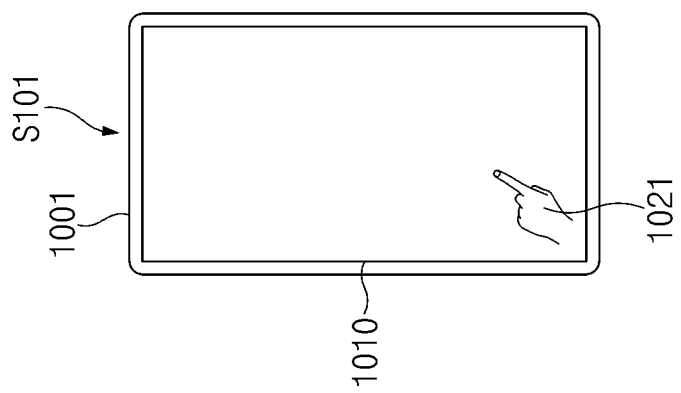

FIG. 10 is a view 1000 illustrating a control method of an electronic device according to an embodiment. Operations of the electronic device 1001 (e.g., the electronic device 201 of FIG. 2) that will be described below may be performed by a processor (e.g., the processor 230 of FIG. 2) of the electronic device 1001.

Referring to FIG. 10, the electronic device 1001 may receive a voice command requesting execution of a cursor mode from a user through a microphone (e.g., the microphone 251 of FIG. 2). The electronic device 1001 may activate (or, execute) the cursor mode, based on the input voice command of the user. For example, when the cursor mode is activated, the electronic device 1001 may display cursors 1021 and 1022 having a hand icon shape on a display 1010 (e.g., the display 210 of FIG. 2).

According to an embodiment, the electronic device 1001, when receiving a selection input of the user, may select one of a "left-hand" mode (a first state S101), a "right-hand" mode (a second state S102), or a "two-hand" mode (a third state S103). In the first state S101, the electronic device 1001 may display the cursor 1121 having a left-hand icon shape on the display 1010. In the second state S102, the electronic device 1001 may display the cursor 1122 having a right-hand icon shape on the display 1010. In the third state S103, the electronic device 1001 may display the cursor 1121 having a left-hand icon shape and the cursor 1122 having a right-hand icon shape together.

According to an embodiment, the electronic device 1001 may execute synchronization of a cursor and a specific part of the user's face, and may control the cursor, based on a gesture of the specific part of the user's face. The electronic device 1001 may not only control the cursor based on the voice command, but may also control the cursor based on the gesture of the specific part of the user's face, thereby processing various complicated tasks and performing multitasking.

Hereinafter, an operation of controlling, by an electronic device, a cursor based on a voice command according to an embodiment will be described with reference to FIGS. 11A to 11C.

Figure 11C:
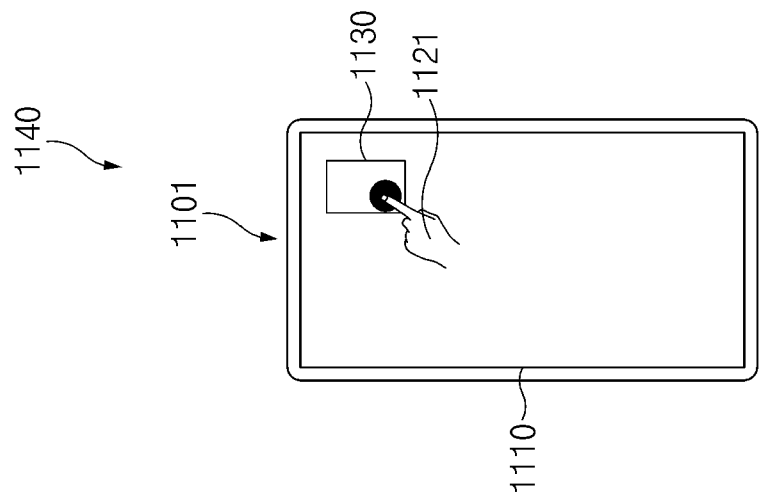
FIGS. 11A to 11C are views illustrating a control method of an electronic device according to an embodiment.
Figure 11B:
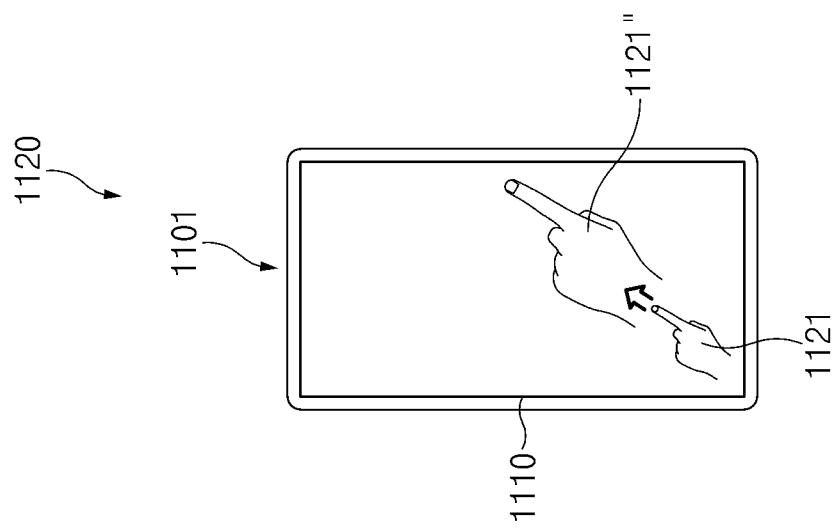
Figure 11A:
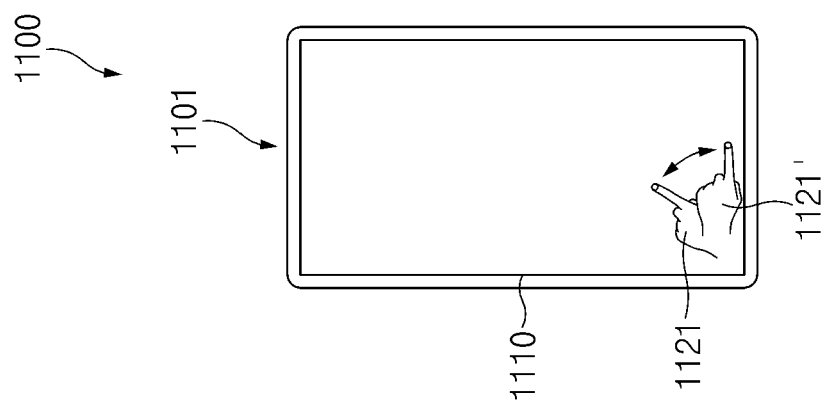

FIGS. 11A to 11C are views 1100, 1120, and 1140 illustrating a control method of an electronic device according to an embodiment. Operations of the electronic device 1101 (e.g., the electronic device 201 of FIG. 2) that will be described below may be performed by a processor (e.g., the processor 230 of FIG. 2) of the electronic device 1101.

Referring to FIGS. 11A to 11C, the electronic device 1101 may receive a voice command to control a cursor 1121 displayed on a display 1110 (e.g., the display 210 of FIG. 2), from a user through a microphone (e.g., the microphone 251 of FIG. 2). The electronic device 1101 may control the angle, size, or position of the cursor 1121, based on the input voice command of the user.

Referring to FIG. 11A, the electronic device 1101 may receive a voice command to change the angle of the cursor 1121, and may thus change the angle of the cursor 1121 accordingly. For example, the electronic device 1101, when receiving the voice command to change the angle, may display a cursor 1121', for which the angle of which is changed to point right-wards instead of diagonally, on the display 1110.

Referring to FIG. 11B, the electronic device 1101 may receive a voice command to change the size of the cursor 1121, and may change the size of the cursor 1121 accordingly. The electronic device 1101, when receiving the voice command to change the size, may display a cursor 1121'', the size of which has been enlarged, on the display 1110.

Referring to FIG. 11C, the electronic device 1101 may receive a voice command to execute an application, move the position of the cursor 1121 onto an object 1130 representing the application requested to be executed, and select the object 1130 using the cursor 1121. The electronic device 1101 may display the operation performed by the voice command through a movement, animation and/or visual effects applied to the displayed cursor 1121, thereby providing real-time feedback to the user in accordance with the inputs.

Hereinafter, an operation of controlling, by an electronic device, the position of a cursor based on a virtual movement map according to an embodiment will be described with reference to FIG. 12.

Figure 12:
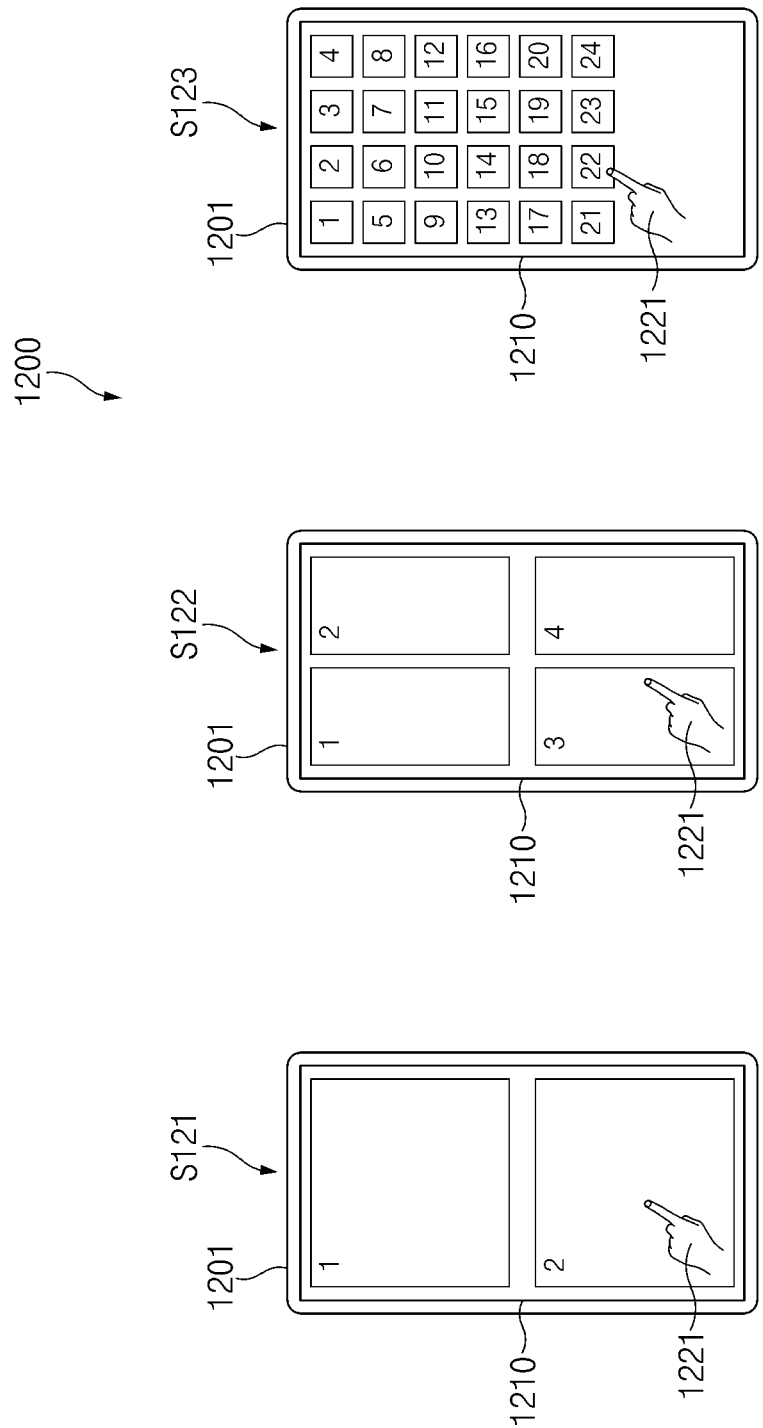
FIG. 12 is a view illustrating a control method of an electronic device according to an embodiment.

FIG. 12 is a view 1200 illustrating a control method of an electronic device according to an embodiment. Operations of the electronic device 1201 (e.g., the electronic device 201 of FIG. 2) that will be described below may be performed by a processor (e.g., the processor 230 of FIG. 2) of the electronic device 1201.

Referring to FIG. 12, the electronic device 1201 may display, on a screen of a display 1210 (e.g., the display 210 of FIG. 2), a virtual movement map including a plurality of cells onto which different identifiers (e.g., numbers) are mapped. According to an embodiment, the virtual movement map may support a movement of a cursor, on which the electronic device 1201 displays position information on the screen output on the display 1210 onto which identifiers are mapped. For example, the electronic device 1201 may translucently display the virtual movement map together with the screen displayed on the display 1210.

In a first state S121, the electronic device 1201 may display a virtual movement map including two cells, to each of which 1 or 2 is allocated. The electronic device 1201 may receive a voice command indicating an identifier (e.g., 1 or 2) from a user through a microphone (e.g., the microphone 251 of FIG. 2). The electronic device 1201, when receiving the voice command of the user, may move the position of a cursor 1221 to a cell onto which the called identifier is mapped. For example, when receiving the user's voice command "number 1", the electronic device may move the position of the cursor 1221 to an arbitrary point in a cell onto which identifier "1" is mapped and may display the cursor 1221.

As in a second state S122 or a third state S123 additionally illustrated, the electronic device 1201 may display a virtual movement map including various numbers of cells having various sizes.

Hereinafter, an operation of expanding, by an electronic device, a specific area based on a virtual movement map according to an embodiment will be described with reference to FIG. 13.

Figure 13:
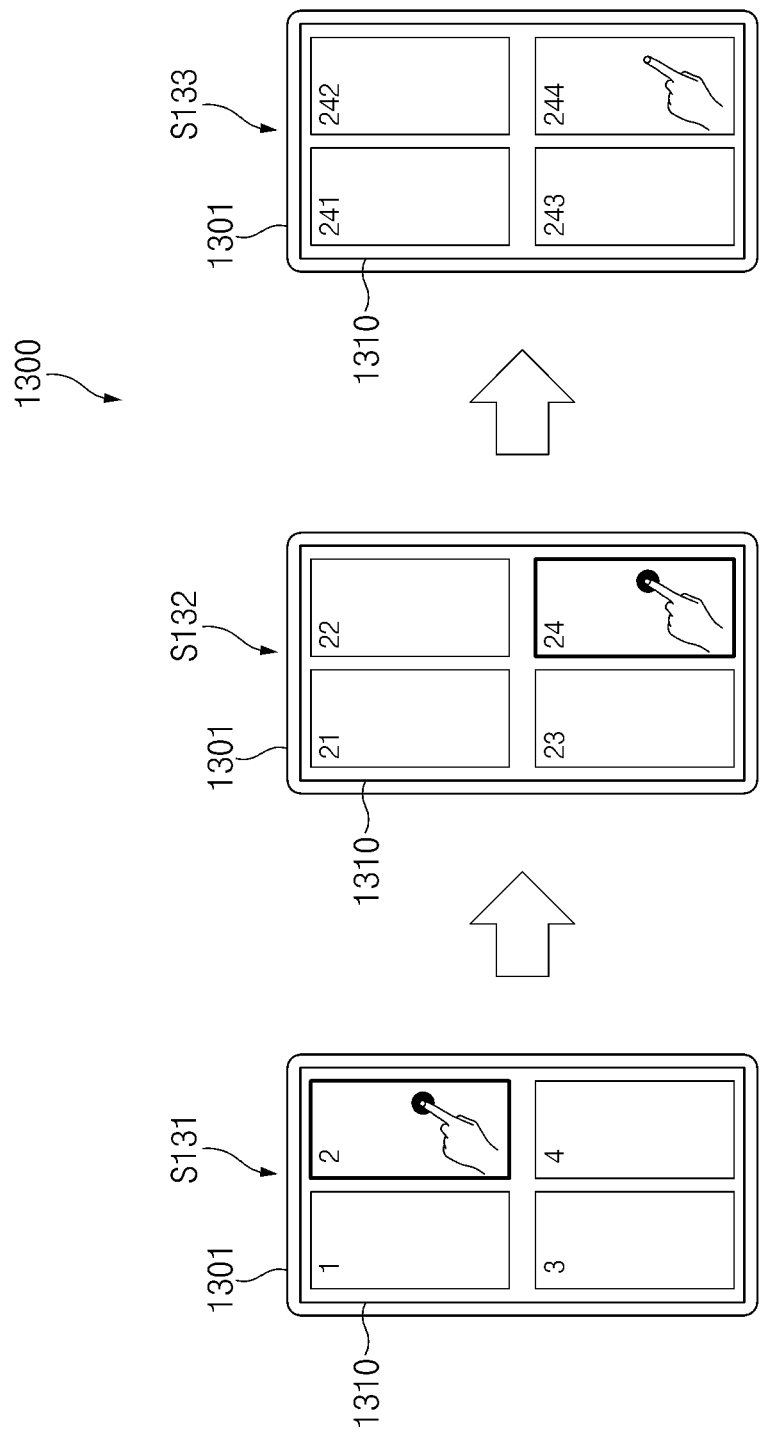
FIG. 13 is a view illustrating a control method of an electronic device according to an embodiment.

FIG. 13 is a view 1300 illustrating a control method of an electronic device according to an embodiment. Operations of the electronic device 1301 (e.g., the electronic device 201 of FIG. 2) that will be described below may be performed by a processor (e.g., the processor 230 of FIG. 2) of the electronic device 1301.

In a first state S131, the electronic device 1301 may display a virtual movement map including four cells onto which identifiers "1", "2", "3", and "4" are mapped. According to an embodiment, when receiving a first voice command indicating an identifier and a second voice command to expand the cell onto which the called identifier is mapped, the electronic device 1301 may display, on a display 1310, an enlarged screen of the cell onto which the called identifier is mapped. For example, when receiving a user's voice command "expand number 2", the electronic device 1301 may expand the cell onto which identifier "2" is mapped and may display the cell on a full screen (e.g., a second state S132).

According to an embodiment, the electronic device 1301, while expanding the cell onto which the called identifier is mapped, may divide the cell into a plurality of sub-cells and may allocate local identifiers to the respective sub-cells. According to an embodiment, the local identifiers may be distinguished from the identifier. For example, when an identifier is specified as a single-digit number (e.g., "2"), the electronic device may specify local identifiers as two-digit numbers (e.g., "21", "22", "23", or "24") associated with the identifier.

In the second state S132, the electronic device 1301 may expand the cell onto which identifier "2" is mapped and may display a virtual movement map including four sub-cells onto which local identifiers "21", "22", "23", and "24" are mapped. According to an embodiment, the relationship between an identifier and a local identifier may be a relative relationship, and therefore a local identifier (e.g., "21", "22", "23", or "24") may be an identifier in the relationship with an enlarged screen of a sub-cell onto which the local identifier is mapped. According to an embodiment, the relationship between a cell and a sub-cell may be a relative relationship, and therefore a sub-cell may be a cell in the relationship with an enlarged screen of the sub-cell.

According to an embodiment, when additionally receiving the user's voice command "expand number 24", the electronic device 1301 may expand the cell onto which identifier "24" is mapped and may display the cell on a full screen (a third state S133).

According to an embodiment, the electronic device 1301, while expanding a cell onto which a called identifier is mapped, may divide the cell into a plurality of sub-cells and may allocate local identifiers to the respective sub-cells. For example, when an identifier is specified as a two-digit number (e.g., "24"), the electronic device 1301 may specify local identifiers as three-digit numbers (e.g., "241", "242", "243", or "244") associated with the identifier.

In the third state S133, the electronic device 1301 may expand the cell onto which identifier "24" is mapped and may display a virtual movement map including four sub-cells onto which local identifiers "241", "242", "243", and "244" are mapped.

According to the embodiments described above with reference to FIGS. 12 and 13, the electronic device may perform control based on a voice command indicating an identifier, thereby enabling a user to rapidly and directly accessing a desired screen. The electronic device may use a gesture input of a specific part of the user's face and a voice input of the user together, thereby rapidly processing a simple task and processing a complicated task with precision.

Hereinafter, an operation of controlling, by an electronic device, the position of a cursor using an identifier of an object according to an embodiment will be described with reference to FIGS. 14A and 14B.

FIGS. 14A and 14B are views 1400 and 1450 illustrating a control method of an electronic device according to an embodiment. Operations of the electronic device 1401 (e.g., the electronic device 201 of FIG. 2) that will be described below may be performed by a processor (e.g., the processor 230 of FIG. 2) of the electronic device 1401.

Referring to FIGS. 14A and 14B, a screen displayed on a display 1410 of the electronic device 1401 may include at least one object (e.g., an icon or a virtual button). According to an embodiment, an identifier may be mapped onto the object. The electronic device 1401 may receive a voice command indicating the identifier mapped onto the object from a user through a microphone (e.g., the microphone 251 of FIG. 2). When receiving the user's voice command indicating the identifier, the electronic device 1401 may move the position of a cursor 1421 such that the cursor 1421 is adjacent to the object onto which the called identifier is mapped and may perform an operation related to the object onto which the called identifier is mapped.

Referring to FIG. 14A, the screen displayed on the display 1410 of the electronic device 1401 may include at least one icon specifying an application. For example, numerical identifiers "1", "2", "3", "4", "5", "6", "7", "8", and "9" may be mapped onto nine icons displayed on the display 1410.

According to an embodiment, when receiving the user's voice command indicating an identifier mapped onto a first icon, the electronic device 1401 may move the position of the cursor 1421 such that the cursor 1421 is adjacent to the first icon. For example, when receiving the user's voice command "number 1", the electronic device 1401 may move the position of the cursor 1421 to a position adjacent to the object onto which identifier "1" is mapped and may display the cursor 1421.

Referring to FIG. 14B, the electronic device 1401 may display, on the display 1410, at least one virtual button (e.g., a first button 1431, a second button 1432, a third button 1433, and a fourth button 1434) that supports page turning. For example, text identifiers "up", "down", "previous", and "next" may be mapped onto the first button 1431, the second button 1432, the third button 1433, and the fourth button 1434, respectively, and an operation of moving a display area of a page in a specified direction or changing the page to a specified page in response to a call of each identifier may be mapped onto a corresponding one of the buttons.

According to an embodiment, when receiving the user's voice command indicating an identifier mapped onto a virtual button, the electronic device 1401 may move the position of the cursor 1421 such that the cursor 1421 is adjacent to the virtual button onto which the called identifier is mapped and may perform an operation mapped onto the virtual button. For example, when receiving the user's voice command "up", the electronic device 1401 may move the position of the cursor 1421 to a position adjacent to the first button 1431 onto which identifier "up" is mapped and may display an upper portion of the page displayed on the display 1410. Furthermore, when receiving the user's voice command "down", the electronic device 1401 may move the position of the cursor 1421 to a position adjacent to the second button 1432 onto which identifier "down" is mapped and may display a lower portion of the page displayed on the display 1410.

In another example, when receiving the user's voice command "previous", the electronic device 1401 may move the position of the cursor 1421 to a position adjacent to the third button 1433 onto which identifier "previous" is mapped and may display the previous page preceding the page displayed on the display 1410. Furthermore, when receiving the user's voice command "next", the electronic device 1401 may move the position of the cursor 1421 to a position adjacent to the fourth button 1434 onto which identifier "next" is mapped and may display the next page following the page displayed on the display 1410.

According to the embodiment described above with reference to FIGS. 14A and 14B, the electronic device 1401 may control a movement of the cursor using the identifiers of the objects, thereby intuitively performing control related to the objects.

Hereinafter, an operation of performing, by an electronic device, multitasking based on a plurality of activated applications using a cursor according to an embodiment will be described with reference to FIG. 15.

Figure 15:
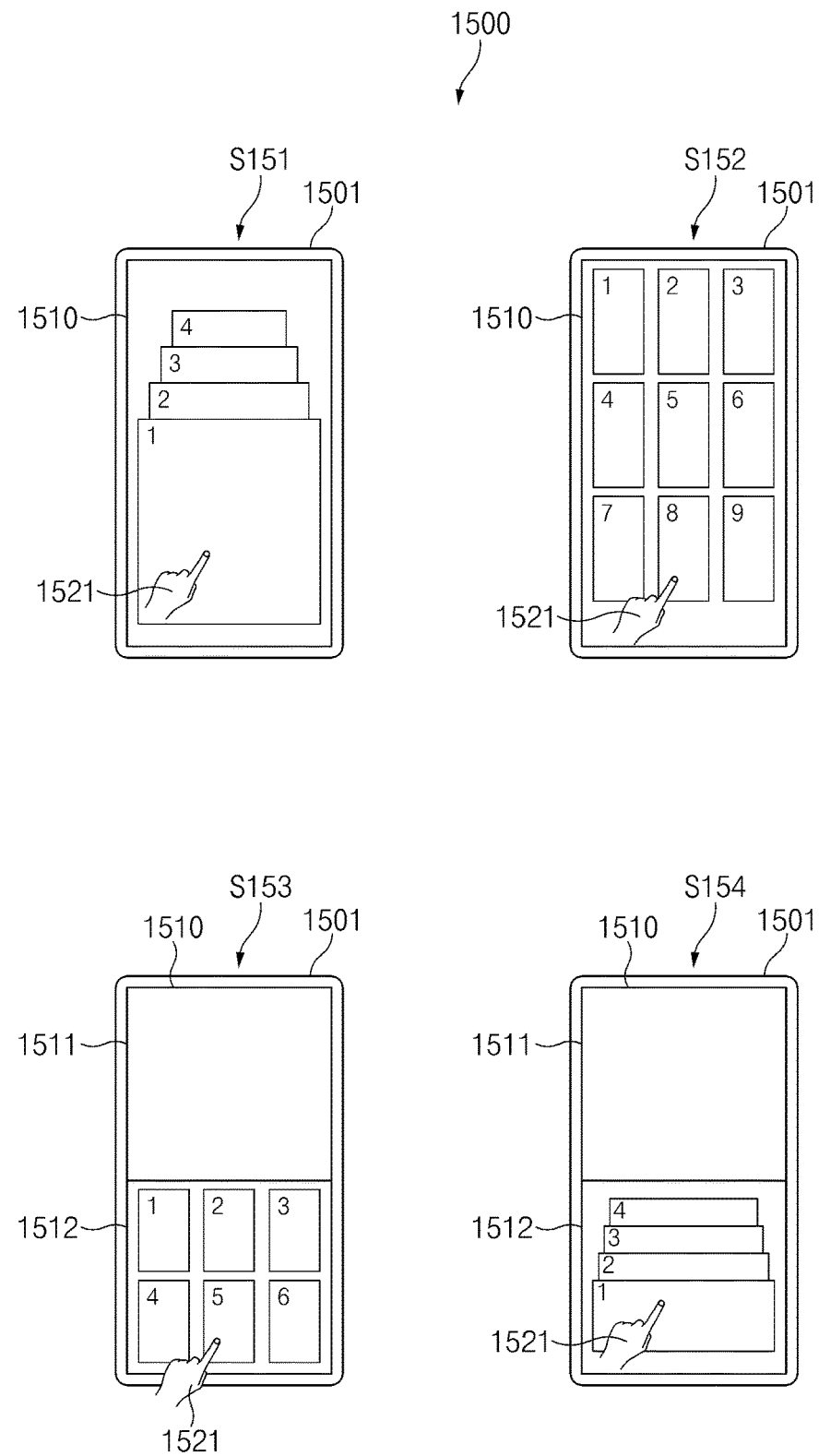
FIG. 15 is a view illustrating a control method of an electronic device according to an embodiment.

FIG. 15 is a view 1500 illustrating a control method of an electronic device according to an embodiment. Operations of the electronic device 1501 (e.g., the electronic device 201 of FIG. 2) that will be described below may be performed by a processor (e.g., the processor 230 of FIG. 2) of the electronic device 1501.

According to an embodiment, the electronic device 1501 may display execution screens of a plurality of activated applications on a screen of a display 1510 by various arrangement methods. For example, as in a first state S151 or a third state S153, the electronic device 1501 may display the execution screens of the plurality of activated applications in a stepwise manner. In another example, as in a second state S152 or a fourth state S154, the electronic device 1501 may display the execution screens of the plurality of activated applications in a tiled manner.

According to an embodiment, the electronic device 1501 may divide a display area of the display 1510 into a main screen area 1511 and an auxiliary screen area 1512. For example, as in the third state S153, the electronic device 1501 may display an execution screen of one of the plurality of applications on the main screen area 1511 as a full screen and may display execution screens of the remaining applications on the auxiliary screen area 1512 in a tiled manner. In another example, the electronic device 1501 may display an execution screen of one of the plurality of applications on the main screen area 1511 as a full screen and may display execution screens of the remaining applications on the auxiliary screen area 1512 in a stepwise manner.

According to an embodiment, the electronic device 1501 may control a cursor 1521, based on a gesture of a specific part of a user's face. According to an embodiment, the user may move the specific part synchronized with the cursor 1521 to move the cursor 1521 to a position where an execution screen of an application is displayed. According to an embodiment, the electronic device 1501 may identify the application indicated by the cursor 1521, based on the position of the cursor 1521 on the display 1510.

According to an embodiment, the electronic device 1501 may receive a voice command to perform a specified operation on an application indicated by the cursor 1521. For example, the electronic device 1501 may receive the user's voice command stating, "Please, update". According to an embodiment, the electronic device 1501 may perform an operation of updating the application indicated by the position of the cursor 1521.

According to an embodiment, the electronic device 1501 may cause an application other than the application being used by the user among the plurality of activated applications to stand by in a background and may perform multitasking using the background application based on control of the cursor 1521 and a voice command.

For example, for the purpose of multitasking, an electronic device capable of specifically voice-based control has to perform a process of calling a virtual assistant based on voice recognition, activating an application through the virtual assistant, and executing an appurtenant function of the application. However, the electronic device 1501 according to the embodiment illustrated in FIG. 15 may specify an application to perform multitasking through cursor control and may call a virtual assistant to cause the specified application to perform multi-tasking. According to an embodiment, the electronic device 1501 may perform voice-based control and cursor control based on a gesture of a specific part of the user's face, thereby increasing intuitiveness of access to an application associated with multitasking.

Hereinafter, an operation of performing, by an electronic device, various commands by tracking a gesture of a specific part of a user's face according to an embodiment will be described with reference to FIGS. 16A and 16B.

Figure 16B:
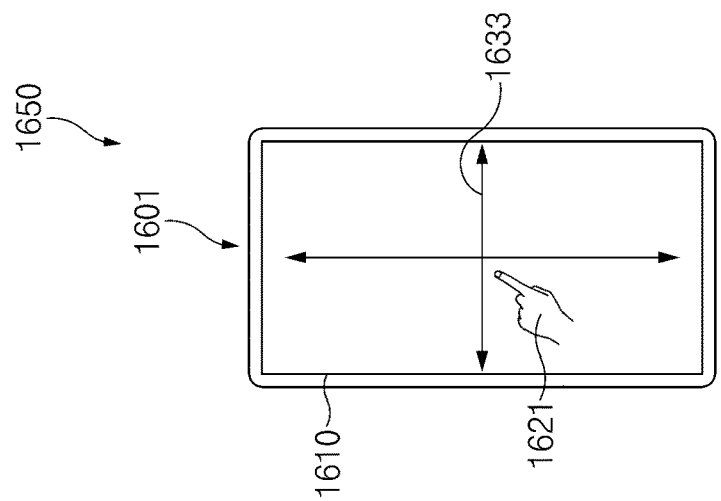
FIGS. 16A and 16B are views illustrating a control method of an electronic device according to an embodiment.
Figure 16A:
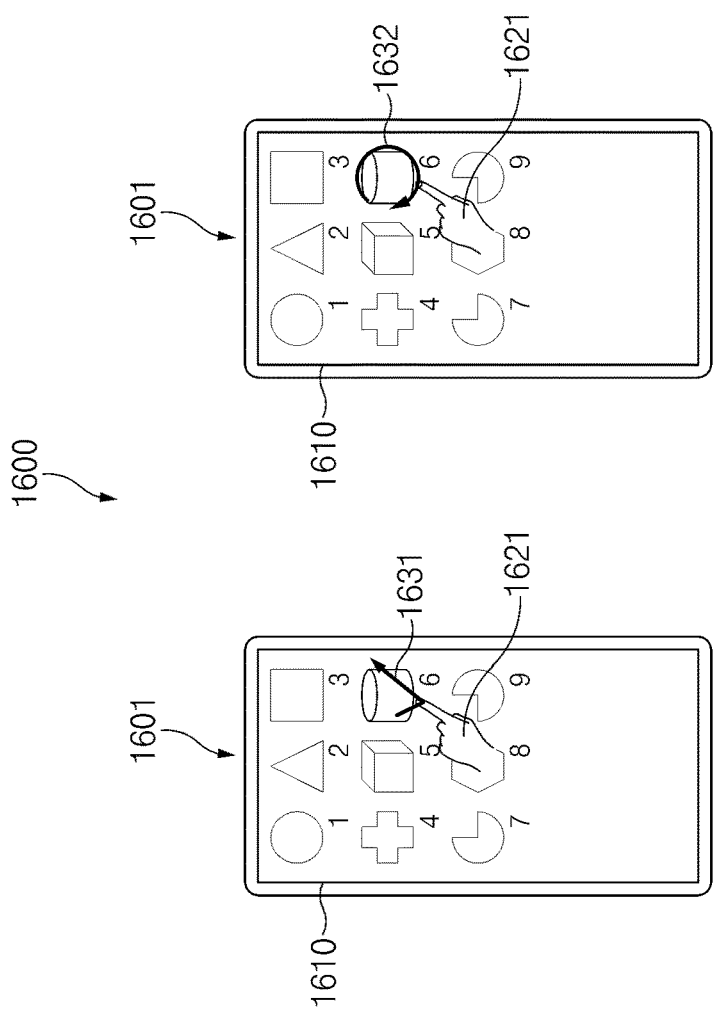

FIGS. 16A and 16B are views 1600 and 1650 illustrating a control method of an electronic device according to an embodiment. Operations of the electronic device 1601 (e.g., the electronic device 201 of FIG. 2) that will be described below may be performed by a processor (e.g., the processor 230 of FIG. 2) of the electronic device 1601.

Referring to FIG. 16A, the electronic device 1601 may display at least one object on a display 1610. According to an embodiment, the at least one object may represent one application. According to an embodiment, the electronic device 1601 may synchronize a specific part of a user's face with a cursor 1621 and may control the cursor 1621, based on a gesture of the specific part. According to an embodiment, the electronic device 1601 may receive a gesture input of the specific part of the user's face to the object and may perform a specified command in response to the gesture input.

According to an embodiment, the electronic device 1601 may track a gesture of the specific part of the user's face and may control a movement of the cursor 1621 such that the cursor 1621 forms a first path 1631 having a check shape. According to an embodiment, the electronic device 1601 may perform a specified command depending on the movement path of the cursor 1621 on the display 1610. According to an embodiment, the electronic device 1601 may perform a specified operation determined depending on the path of the cursor 1621 for an application that an object corresponding to the position of the cursor 1621 represents. For example, the electronic device 1601 may identify the position of the cursor 1621 that corresponds to object 6 and the first path 1631 having a check shape and may perform an operation of selecting or executing an application corresponding to object 6.

According to another embodiment, the electronic device 1601 may track a gesture of the specific part of the user's face and may control a movement of the cursor 1621 such that the cursor 1621 forms a second path 1632 having a circular shape. For example, the electronic device 1601 may identify the position of the cursor 1621 that corresponds to object 6 and the second path 1632 having a check shape and may perform an operation of selecting or executing an application corresponding to object 6.

Referring to FIG. 16B, the electronic device 1601 may track a gesture of the specific part of the user's face and may control a movement of the cursor 1621 such that the cursor 1621 forms a third path 1633 moving up, down, left, and right. For example, the electronic device 1601 may identify the third path 1633 of the cursor 1621 moving up, down, left, and right and may move a screen displayed on the display 1610 upward or downward, or may switch the screen to the previous screen or the next screen.

A movement path of the cursor 1621 identified by the electronic device 1601 according to the embodiment and specified operations mapped onto the path of the cursor 1621 are not limited to the examples disclosed in the above-described embodiments. The electronic device 1601 may control the electronic device 1601 by performing various operations mapped onto various movement paths of the cursor depending on gestures of the specific part of the user's face.

According to an embodiment of the disclosure, an electronic device (e.g., the electronic device 101 of FIG. 1, the electronic device 201 of FIG. 2, the electronic device 401 of FIGS. 4A and 4B, the electronic device 501 of FIGS. 5A to 5D, the electronic device 601 of FIG. 6, the electronic device 801 of FIG. 8, the electronic device 1001 of FIG. 10, the electronic device 1101 of FIGS. 11A and 11B, the electronic device 1201 of FIG. 12, the electronic device 1301 of FIG. 13, the electronic device 1401 of FIGS. 14A and 14B, the electronic device 1501 of FIG. 15, or the electronic device 1601 of FIGS. 16A and 16B) may include a display (e.g., the display module 160 of FIG. 1, the display 210 of FIG. 2, the display 420 of FIGS. 4A and 4B, the display 620 of FIG. 6, the display 1010 of FIG. 10, the display 1110 of FIGS. 11A to 11C, the display 1210 of FIG. 12, the display 1310 of FIG. 13, the display 1410 of FIGS. 14A and 14B, the display 1510 of FIG. 15, or the display 1610 of FIGS. 16A and 16B), a sensor module (e.g., the sensor module 176 of FIG. 1 or the sensor module 220 of FIG. 2), a processor (e.g., the processor 120 of FIG. 1 or the processor 230 of FIG. 2) operatively connected to the display and the sensor module, and a memory (e.g., the memory 130 of FIG. 1 or the memory 240 of FIG. 2) operatively connected to the processor.

According to an embodiment, the memory may store one or more instructions that, when executed, cause the processor to set an initial value by obtaining inertial information including at least one of position information, tilt information, or movement information of the electronic device, distance information between the electronic device and a user, and angle information of a face of the user through the sensor module, determine a first virtual coordinate system mapped onto a screen of the display, based on the initial value, display a cursor at a position on the screen that corresponds to coordinates of one of the user's body parts within the first virtual coordinate system, detect a change in one or more of the distance information, the angle information, or the inertial information through the sensor module after setting the initial value, and correct a second virtual coordinate system changed from the first virtual coordinate system, based on an amount of change in the first virtual coordinate system such that the second virtual coordinate system is mapped onto the screen.

According to an embodiment of the disclosure, the sensor module may include an image sensor, and the distance information or the angle information is obtained using the image sensor.

According to an embodiment of the disclosure, the memory may store a plurality of virtual coordinate systems, each corresponding to different respective values for the distance information, the angle information, and the inertial information, and the instructions may cause the processor to select the first virtual coordinate system from among the plurality of virtual coordinate systems based on the initial value.

According to an embodiment of the disclosure, the setting the initial value further includes displaying the cursor at a specified position on the screen, determining a body part of the user as a focal point, wherein the body part is a prespecified part, or set according to the distance information, synchronizing the cursor and the focal point according to the determination that a position on the screen, which is corresponding to the focal point, is adjacent to the specified position of the cursor, and moving the cursor displayed on the screen according to detected movement of the focal point.

According to an embodiment of the disclosure, the focal point may include a midpoint between the centers of two pupils of the user, or a part of the user's face closest to the electronic device.

According to an embodiment of the disclosure, the sensor module may include an image sensor, and the distance information is obtained by measuring a distance from the image sensor to the focal point.

According to an embodiment of the disclosure, the instructions may cause the processor to output a user interface prompting movement of the focal point such that the cursor traces a movement path along a periphery of the display, and determine a two-dimensional coordinate system of the first virtual coordinate system, based on the movement path of the cursor.

According to an embodiment of the disclosure, the two-dimensional coordinate system may include feature information including an aspect ratio, lengths of four sides, and four angles, and the instructions may cause the processor to correct the second virtual coordinate system by compensating for the feature information by an amount of change in the feature information.

According to an embodiment of the disclosure, the amount of change in the first virtual coordinate system may be determined based on the amount of detected change in the distance information, the angle information, or the inertial information.

According to an embodiment of the disclosure, the instructions may cause the processor to provide, to the user, a user interface that guides states of the electronic device and the user that correspond to the initial value, based on a change in the distance information, the angle information, or the inertial information.

According to an embodiment of the disclosure, the electronic device may further include a voice input module, and the instructions may cause the processor to receive a first voice command requesting execution of a cursor mode through the voice input module, and display at least one cursor on the screen of the display in response to receiving the first voice command.

According to an embodiment of the disclosure, the instructions may cause the processor to receive a second voice command requesting a control of the at least one cursor through the voice input module, and adjust a size, an angle, or a position of the at least one cursor based on the received second voice command.

According to an embodiment of the disclosure, the instructions may cause the processor to display, on the screen of the display, a virtual movement map including a plurality of cells on which different identifiers are respectively mapped and receive a third voice command including designation of one identifier through the voice input module, and move a position of the at least one cursor to a cell onto which the designated identifier is mapped based on the received third voice command.

According to an embodiment of the disclosure, the instructions may cause the processor to receive a fourth voice command requesting expansion of the cell having the designated identifier mapped thereon, with the third voice command, through the voice input module, and display, on the display, an enlarged screen of representing the cell mapped to the designated identifier, and the enlarged screen may include a plurality of sub-cells onto which local identifiers of the cell are mapped.

According to an embodiment of the disclosure, the screen may include at least one object having an identifier mapped thereon, and the instructions may cause the processor to receive a fifth voice command designating the identifier through the voice input module, and move a position of the at least one cursor to be adjacent to the object having the designated identifier mapped thereon.

According to an embodiment of the disclosure, the instructions may cause the processor to display execution screens of a plurality of applications on the screen, select an application from among the plurality of applications, based on a position of the at least one cursor, and perform an operation corresponding to at least one voice command input through the voice input module for the selected application.

According to an embodiment of the disclosure, the instructions may cause the processor to track a gesture of a specific part of the user's body using the sensor module and perform a control command mapped to the gesture.

According to an embodiment of the disclosure, a method of an electronic device (e.g., the electronic device 101 of FIG. 1, the electronic device 201 of FIG. 2, the electronic device 401 of FIGS. 4A and 4B, the electronic device 501 of FIGS. 5A to 5D, the electronic device 601 of FIG. 6, the electronic device 801 of FIG. 8, the electronic device 1001 of FIG. 10, the electronic device 1101 of FIGS. 11A and 11B, the electronic device 1201 of FIG. 12, the electronic device 1301 of FIG. 13, the electronic device 1401 of FIGS. 14A and 14B, the electronic device 1501 of FIG. 15, or the electronic device 1601 of FIGS. 16A and 16B) may include setting, by at least one processor, an initial value by obtaining inertial information including at least one of position information, tilt information, or movement information of the electronic device, distance information between the electronic device and a user, and angle information of a face of the user through one or more sensors, determining a first virtual coordinate system mapped onto a screen of a display (e.g., the display module 160 of FIG. 1, the display 210 of FIG. 2, the display 420 of FIGS. 4A and 4B, the display 620 of FIG. 6, the display 1010 of FIG. 10, the display 1110 of FIGS. 11A to 11C, the display 1210 of FIG. 12, the display 1310 of FIG. 13, the display 1410 of FIGS. 14A and 14B, the display 1510 of FIG. 15, or the display 1610 of FIGS. 16A and 16B), based on the initial value, displaying a cursor at a position on the screen corresponds to coordinates of one of the user's body parts within the first virtual coordinate system, detecting a change in one or more of the distance information, the angle information, or the inertial information through one or more sensors after setting the initial value, and correcting a second virtual coordinate system changed from the first virtual coordinate system, based on an amount of change in the first virtual coordinate system such that the second virtual coordinate system is mapped onto the screen.

According to an embodiment of the disclosure, the setting of the initial value may include displaying the cursor at a specified position on the screen, determining a body part of the user as a focal point, wherein the body part is a prespecified part or set according to the distance information, and synchronizing the cursor and the focal point according to the determination that a position on the screen, corresponding to the focal point, is adjacent to the specified position of the cursor, and the method may further include moving the cursor displayed on the screen according to detected movement of the focal point.

According to an embodiment of the disclosure, a two-dimensional coordinate system of the first virtual coordinate system is determined based on a movement path of the focal point, the two-dimensional coordinate system includes feature information including an aspect ratio, lengths of four sides, and four angles, and the correcting of the second virtual coordinate system may include compensating for the feature information by an amount of change in the feature information depending on the change in the distance information, the angle information, or the inertial information.

The electronic device according to certain embodiments may be one of various types of electronic devices. The electronic devices may include, for example, a portable communication device (e.g., a smartphone), a computer device, a portable multimedia device, a portable medical device, a camera, a wearable device (e.g., a device that can be mounted on at least part of the user's body, including a watch, glasses, or earphones), or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a sensor module;
a processor operatively connected to the display and the sensor module; and
a memory operatively connected to the processor,
wherein the memory stores one or more instructions that, when executed, cause the processor to:
set an initial value by obtaining inertial information including at least one of position information, tilt information, or movement information of the electronic device, distance information between the electronic device and a user, and angle information of a face of the user, through the sensor module;
determine a first virtual coordinate system mapped onto a screen of the display, based on the initial value;
display a cursor at a position on the screen that corresponds to coordinates of one of the user's body parts within the first virtual coordinate system;
detect a change in one or more of the distance information, the angle information, or the inertial information through the sensor module after setting the initial value; and
correct a second virtual coordinate system changed from the first virtual coordinate system, based on an amount of change in the first virtual coordinate system such that the second virtual coordinate system is mapped onto the screen.

2. The electronic device of claim 1, wherein the sensor module includes an image sensor, and
wherein the distance information or the angle information is obtained using the image sensor.

3. The electronic device of claim 1, wherein the memory stores a plurality of virtual coordinate systems, each corresponding to different respective values for the distance information, the angle information, and the inertial information, and
wherein the instructions cause the processor to:
select the first virtual coordinate system from among the plurality of virtual coordinate systems based on the initial value.

4. The electronic device of claim 1, wherein setting the initial value further includes:
displaying the cursor at a specified position on the screen,
determining a body part of the user as a focal point,
wherein the body part is a prespecified part, or set according to the distance information,
synchronizing the cursor and the focal point according to the determination that a position on the screen, corresponding to the focal point, is adjacent to the specified position of the cursor; and
moving the cursor displayed on the screen according to detected movement of the focal point.

5. The electronic device of claim 4, wherein the focal point includes a midpoint between the centers of two pupils of the user, or a part of the user's face closest to the electronic device.

6. The electronic device of claim 4, wherein the sensor module includes an image sensor, and
wherein the distance information is obtained by measuring a distance from the image sensor to the focal point.

7. The electronic device of claim 4, wherein the instructions cause the processor to:
output a user interface prompting movement of the focal point such that the cursor traces a movement path along a periphery of the display; and
determine a two-dimensional coordinate system of the first virtual coordinate system, based on the movement path of the cursor.

8. The electronic device of claim 7, wherein the two-dimensional coordinate system includes feature information, including an aspect ratio, lengths of four sides, and four angles, and
wherein the instructions cause the processor to:
correct the second virtual coordinate system by compensating for the feature information by an amount of change in the feature information.

9. The electronic device of claim 1, wherein the amount of change in the first virtual coordinate system is determined based on the amount of detected change in the distance information, the angle information, or the inertial information.

10. The electronic device of claim 1, wherein the instructions cause the processor to provide, to the user, a user interface configured to guide states of the electronic device and the user that correspond to the initial value, based on a change in the distance information, the angle information, or the inertial information.

11. The electronic device of claim 1, wherein the electronic device further comprises a voice input module, and wherein the instructions cause the processor to:
receive a first voice command requesting execution of a cursor mode through the voice input module, and display at least one cursor on the screen of the display in response to receiving the first voice command.

12. The electronic device of claim 11, wherein the instructions cause the processor to receive a second voice command requesting a control of the at least one cursor through the voice input module, and adjust a size, an angle, or a position of the at least one cursor based on the received second voice command.

13. The electronic device of claim 11, wherein the instructions cause the processor to:
display, on the screen of the display, a virtual movement map including a plurality of cells on which different identifiers are respectively mapped; and
receive a third voice command including designation of one identifier through the voice input module, and
based on the received third voice command, move a position of the at least one cursor to a cell onto which the designated identifier is mapped.

14. The electronic device of claim 13, wherein the instructions cause the processor to:
receive a fourth voice command requesting expansion of the cell having the designated identifier mapped thereon, with the third voice command, through the voice input module; and
display, on the display, an enlarged screen representing the cell mapped to the designated identifier,
wherein the enlarged screen includes a plurality of sub-cells onto which local identifiers of the cell are mapped.

15. The electronic device of claim 11, wherein the screen includes at least one object having an identifier mapped thereon, and
wherein the instructions cause the processor to:
receive a second voice command designating the identifier through the voice input module, and
move a position of the at least one cursor to be adjacent to the object having the designated identifier mapped thereon.

16. The electronic device of claim 11, wherein the instructions cause the processor to:
display execution screens of a plurality of applications on the screen;
select an application from among the plurality of applications, based on a position of the at least one cursor; and
perform an operation corresponding to at least one voice command input through the voice input module for the selected application.

17. The electronic device of claim 1, wherein the instructions cause the processor to:
track a gesture of a specific part of the user's body using the sensor module; and
perform a control command mapped to the gesture.

18. A method of an electronic device, comprising:
by at least one processor, setting an initial value by obtaining inertial information including at least one of position information, tilt information, or movement information of the electronic device, distance information between the electronic device and a user, and angle information of a face of the user through one or more sensors;
determining a first virtual coordinate system mapped onto a screen of a display, based on the initial value;
displaying a cursor at a position on the screen corresponds to coordinates of one of the user's body parts within the first virtual coordinate system;
after setting the initial value, detecting a change in one or more of the distance information, the angle information, or the inertial information through the one or more sensors; and
correcting a second virtual coordinate system changed from the first virtual coordinate system, based on an amount of change in the first virtual coordinate system such that the second virtual coordinate system is mapped onto the screen.

19. The method of claim 18, wherein the setting of the initial value includes:
displaying the cursor at a specified position on the screen,
determining a body part of the user as a focal point, wherein the body part is a prespecified part or set according to the distance information, and
synchronizing the cursor and the focal point according to the determination that a position on the screen, corresponding to the focal point, is adjacent to the specified position of the cursor, and
wherein the method further comprises:
moving the cursor displayed on the screen according to detected a movement of the focal point.

20. The method of claim 19, wherein a two-dimensional coordinate system of the first virtual coordinate system is determined based on a movement path of the focal point,
wherein the two-dimensional coordinate system includes feature information including an aspect ratio, lengths of four sides, and four angles, and
wherein the correcting of the second virtual coordinate system includes compensating for the feature information by an amount of the change in the feature information according to changes in one or more of the distance information, the angle information, or the inertial information.

* * * * *